(12) United States Patent
Munro

(10) Patent No.: US 10,859,415 B2
(45) Date of Patent: Dec. 8, 2020

(54) FLOW MEASUREMENT APPARATUS AND METHOD OF USE

(71) Applicant: GM Flow Measurement Services Limited, Peterhead (GB)

(72) Inventor: Gavin Munro, Peterhead (GB)

(73) Assignee: GM Flow Measurement Services Limited, Peterhead (GB)

( * ) Notice: Subject to any disclaimer, the term of this patent is extended or adjusted under 35 U.S.C. 154(b) by 156 days.

(21) Appl. No.: 15/573,122

(22) PCT Filed: May 27, 2016

(86) PCT No.: PCT/GB2016/051543
§ 371 (c)(1),
(2) Date: Nov. 9, 2017

(87) PCT Pub. No.: WO2016/193681
PCT Pub. Date: Dec. 8, 2016

(65) Prior Publication Data
US 2018/0128661 A1    May 10, 2018

(30) Foreign Application Priority Data

May 29, 2015  (GB) .................................. 1509334.7

(51) Int. Cl.
*G01F 1/40*     (2006.01)
*G01F 1/44*     (2006.01)
(Continued)

(52) U.S. Cl.
CPC .................. *G01F 1/40* (2013.01); *G01F 1/22* (2013.01); *G01F 1/26* (2013.01); *G01F 1/34* (2013.01);
(Continued)

(58) Field of Classification Search
CPC . G01F 1/40; G01F 1/22; G01F 15/001; G01F 1/44; G01F 1/34; G01F 1/26;
(Continued)

(56) References Cited

U.S. PATENT DOCUMENTS 3,182,501 A   5/1965   Haase
3,554,031 A   1/1971   Turner
(Continued)

FOREIGN PATENT DOCUMENTS

EP      0124666     11/1984
EP      0971211     1/2000
(Continued)

OTHER PUBLICATIONS

International Search Report and Written Opinion for international application No. PCT/GB2016/051543 dated Oct. 7, 2016.

*Primary Examiner* — Marrit Eyassu
(74) *Attorney, Agent, or Firm* — Workman Nydegger

(57) ABSTRACT

The invention provides an apparatus and method for measuring fluid flow rates. The apparatus comprises a meter body comprising a throughbore with a fluid flow path and a flow displacement member. The apparatus also provides a sleeve slidably mounted within the fluid flow path. The sleeve is configured to be movable between at least two axial positions within the fluid flow path to select a predetermined flow rate measurement range for the flow measurement apparatus.

34 Claims, 15 Drawing Sheets

(51) Int. Cl.
*G01F 1/34* (2006.01)
*G01F 15/00* (2006.01)
*G01F 1/26* (2006.01)
*G01F 1/22* (2006.01)
G01F 1/46 (2006.01)
G01F 1/32 (2006.01)
G01F 1/90 (2006.01)
G01F 1/42 (2006.01)
G01F 1/66 (2006.01)
G01F 1/84 (2006.01)
G01F 1/58 (2006.01)
G01F 1/56 (2006.01)
G01F 1/68 (2006.01)

(52) U.S. Cl.
CPC .............. *G01F 1/44* (2013.01); *G01F 15/001* (2013.01); *G01F 15/005* (2013.01); *G01F 1/3209* (2013.01); *G01F 1/42* (2013.01); *G01F 1/46* (2013.01); *G01F 1/56* (2013.01); *G01F 1/58* (2013.01); *G01F 1/66* (2013.01); *G01F 1/663* (2013.01); *G01F 1/68* (2013.01); *G01F 1/84* (2013.01); *G01F 1/90* (2013.01)

(58) Field of Classification Search
CPC . G01F 15/005; G01F 1/90; G01F 1/84; G01F 1/68; G01F 1/663; G01F 1/66; G01F 1/58; G01F 1/56; G01F 1/46; G01F 1/42; G01F 1/3209

USPC ...................................................... 73/861.63
See application file for complete search history.

(56) References Cited

U.S. PATENT DOCUMENTS

| | | | | |
|---|---|---|---|---|
| 4,873,873 | A | * 10/1989 | Day | ........................ G01F 1/22 |
| | | | | 73/861.63 |
| 5,127,173 | A | * 7/1992 | Thurston | ............... G01F 1/3227 |
| | | | | 73/202 |
| 5,404,758 | A | 4/1995 | Huber et al. | |
| 7,992,453 | B1 | * 8/2011 | Lawrence | ................. G01F 1/32 |
| | | | | 73/861.42 |
| 2011/0259119 | A1 | * 10/2011 | Steven | .................... G01F 1/363 |
| | | | | 73/861.42 |
| 2012/0096949 | A1 | * 4/2012 | Lawrence | ................. G01F 1/40 |
| | | | | 73/861.65 |
| 2013/0213142 | A1 | 8/2013 | Irani et al. | |

FOREIGN PATENT DOCUMENTS

| | | | | |
|---|---|---|---|---|
| EP | 0971211 | A2 * | 1/2000 | ............... G01F 1/44 |
| GB | 1274651 | | 5/1972 | |
| JP | H0875621 | | 3/1996 | |
| JP | H09218062 | | 8/1997 | |
| JP | 2000028407 | A | 1/2000 | |
| KR | 20120056382 | | 6/2012 | |

\* cited by examiner

FLOW MEASUREMENT APPARATUS AND METHOD OF USE

CROSS-REFERENCE TO RELATED APPLICATIONS

The present invention is a 35 U.S.C. § 371 U.S. National Stage of International Application No. PCT/GB2016/051543, filed on May 27, 2016, which claims priority to Great Britain Patent Application No. 1509334.7, filed May 29, 2015, the entire content of each of which is incorporated herein by reference.

The present invention relates to a flow measurement apparatus and a method of use, and particular to flow measurement apparatus used to measure fluid flow rates in oil and gas industry systems. Aspects of the invention relate to an apparatus and method for measuring a flow rate in a production flow stream.

BACKGROUND TO THE INVENTION

Industries such as the offshore oil and gas production industry recognise the considerable value in accurately monitoring fluid flow in production flow streams. Conventionally fluid flow meter devices are inserted into a production pipeline to monitor a flow rate of a fluid.

One particular type of flow meter is a differential pressure flow meter which relies on the Bernoulli principle. The Bernoulli principle states that an increase in the speed of a fluid occurs simultaneously with a decrease in the pressure of the fluid. These measurement devices measure the differential pressure induced in the fluid as it flows through a constriction or around an obstacle in the fluid conduit. The flow rate of the fluid may then be accurately determined from the pressure difference.

Typically differential pressure flow meters are designed and calibrated for a specific fluid type and have a predetermined flow rate range. However, during fluid production operations, the fluid flow rate may vary considerably and may be outside the predetermined range that the meter is capable of accurately measuring. This may lead to inaccurate flow measurements or in some cases the flow meter not measuring the flow rate at all.

A known method of changing flow rate measurement range of a flow meter is to change the dimensions of the constriction or obstacle to change the beta ratio of the flow meter. The beta ratio is the ratio of the diameter of the constriction or obstacle to the fluid conduit diameter.

US 2012/0096949 discloses a device for changing a beta ratio of a flow measurement device. The device includes a flange and a sleeve extending axially from the flange. The sleeve may be inserted into a fluid conduit of the flow measurement device to reduce the inner diameter of the fluid conduit around a fluid displacement member.

A disadvantage of the device described in US 2012/0096949 is that it requires the removal and replacement of components of the system from the pipeline which requires that the entire pipeline pressure to be bled off. This may result in flammable and potentially toxic fluids being released into the atmosphere around the pipeline. In addition, the pipeline bleeding operation can be time consuming and expensive especially if the pipeline is large and if the monetary value of the expelled fluid is high.

After reinstalling the measurement apparatus, fluid must be re-introduced slowly into the pipeline to ensure no leaks occur. During this operation the system production line must be offline, resulting in lost revenue and/or rig time.

U.S. Pat. No. 5,404,758 discloses a flow meter device for determining the amount of flowing medium using an orifice and a resistor body in a cavity through which the medium to be measured flows. The orifice sleeve is displaced as a consequence of the varying primary pressure and the degree of opening of the flow orifice is determined depending on the amount of flow of the flowing medium.

However, the flow meter device described in U.S. Pat. No. 5,404,758 has the disadvantage that it is not possible to accurately monitor the position of the orifice sleeve relative to the resistor during use of the flow meter. The position of the sleeve varies as the pressure of the fluid acting on the orifice sleeve changes. This limits the accuracy of the flow meter as precise measurement of the flow area is required to accurately determine a given flow rate. If the exact position of the orifice sleeve is unknown then calculation may be based on an incorrect beta ratio value. Failure to accurately measure the flow rate could have safety and financial impacts on oil and gas operations.

SUMMARY OF THE INVENTION

It is another object of at least one aspect of the present invention to obviate or at least mitigate the foregoing disadvantages of prior art flow meters.

It is an object of an aspect of the present invention to provide a flow measurement apparatus with improved accuracy and/or efficiency which is capable of reliably measuring a wide range of fluid flow rates.

It is a further aspect of the present invention to provide a robust, reliable and compact flow measurement apparatus which is capable of changing the beta ratio of the measurement apparatus quickly such that the flow rate of the fluid can be accurately measured.

Further aims and objects of the invention will become apparent from reading the following description.

According to a first aspect of the invention, there is provided a flow measurement apparatus comprising:
a meter body comprising a throughbore with a fluid flow path;
a flow displacement member; and
a sleeve movably mounted within the fluid flow path;
wherein the sleeve is configured to be movable between at least two axial positions within the fluid flow path to select a predetermined flow rate measurement range for the flow measurement apparatus.

The above invention may facilitate a wide range of flow rates to be quickly and accurately measured by moving the sleeve to different axial positions in the fluid flow path and thereby changing the fluid flow area and/or beta ratio of the flow measurement apparatus.

This may avoid time consuming, expensive and dangerous operations to dismantle a flow meter apparatus to remove and/or insert components to change the beta ratio of the flow measurement apparatus.

The flow measurement apparatus does not need to be removed from a flowline or dismantled to change the flow rate measurement range of the flow measurement apparatus. The range of the flow rates that the flow measurement apparatus can measure may be changed while the system and/or flowline to which the flow measurement apparatus is connected or located is online. The flow measurement range of the measurement apparatus may be changed while the system and/or flowline is pressurised. This may allow operators to change the flow measurement range, without risk of injury, or release of poisonous or flammable gas.

The sleeve may be set at different axial positions within the fluid flow path. The sleeve may be set at predetermined axial positions within the fluid flow path to allow a range of beta ratio values to be set in the flow measurement apparatus.

By providing a flow measurement apparatus with a movable sleeve which is capable of being set at precise axial positions within the meter body throughbore fluid flow path, the beta ratio can be reliably set and accurate flow rate measurement readings may be calculated. This may allow the user to select the most applicable measurement range (i.e. high range or low range) for the meter apparatus while the system and/or flowline is online and/or pressurised.

Preferably the sleeve is configured to be slidably mounted within the fluid flow path. The sleeve may be any annular shape. The inner diameter of the sleeve may be smaller than the inner diameter of the meter body bore. The sleeve may be configured to change the diameter of the fluid flow path of the meter body throughbore. The diameter of the fluid flow path and the sleeve may be dimensioned to measure a range of flow rates.

Preferably the sleeve is configured to move relative to the flow displacement member to change the flow area around the flow displacement member.

Preferably the sleeve is configured to move relative to the flow displacement member to change the inner diameter of the bore surrounding the flow displacement member. In one axial sleeve position the sleeve may be axially displaced away from the flow displacement member such that the flow area around the flow displacement member has the inner diameter of the meter body throughbore. In another axial sleeve position, the sleeve may surround the flow displacement member such that flow area around the flow displacement member has the inner diameter of the sleeve.

The sleeve may have a range of sizes and/or shaped profiles. The sleeve may have an entrance throat section and/or an exit throat section. The entrance and/or exit throat sections may have an inclined, tapered or stepped profile. The stepped profile may comprise a series of steps. The inner diameter of each step of the entrance throat section and/or an exit throat section of the sleeve may have a predetermined diameter which may be different to the inner diameter of the other steps of the throat section and/or the inner diameter of the sleeve.

The flow measurement apparatus may be a pitot tube, venturi, vortex, orifice, ultrasonic, turbine, nozzle, rotameter, calorimetric, electromagnetic, magnetic, Doppler, thermal, coriolis and/or pressure differential flow meter.

Preferably the flow measurement apparatus is a pressure differential flow meter.

Preferably a mechanism is configured to accurately adjust, control and/or set the axial position of the sleeve in the fluid flow path. Preferably the mechanism is located outside the fluid flow path.

The mechanism may be selected from a linear motion, rotary motion, reciprocating motion and/or oscillating motion actuator.

The mechanism may be selected from springs, levers, cams, cranks, screws, gears, pistons and/or pulleys. The gears may include spur, rack and pinion, bevel and/or worm gears.

A component of the mechanism may extend into the fluid flow path to engage the sleeve. The component of the mechanism may comprise springs, levers, cams, cranks, screws, gears, pistons, pulleys and/or an actuator arm.

Preferably the meter body may comprise an aperture configured to allow a component of the mechanism to extend into the fluid flow path of the meter body throughbore to engage and/or couple the sleeve.

The mechanism may be manually, hydraulically, pneumatically, electrically or mechanically actuated.

The fluid may be oil, gas, steam, water, waste product or any other suitable fluid.

The meter body may have connectors such as flanges at each end to secure the meter body to a section of pipe work.

The meter body may be clamped, bolted and/or welded to a section of pipe work.

Preferably the flow displacement member is a conical cone. The flow displacement member may have a first diverging section and second converging section. The interface between diverging and converging section may form a peripheral edge.

The flow displacement member may be positioned centrally in the fluid flow path. The flow displacement member may be supported by at least one support member.

Preferably the distance between the peripheral edge of the displacement member and the inner diameter of the meter body throughbore, inner diameter of the sleeve and/or a inner diameter of the throat section of the sleeve may define a flow area and/or beta ratio.

The ratio of the diameter of the peripheral edge of the displacement member to an inner diameter of the meter body throughbore or an inner diameter of the sleeve may define a beta ratio of the measurement apparatus.

The ratio of diameter of the peripheral edge of the displacement member to an inner diameter of the sleeve throat section may define a beta ratio of the measurement apparatus.

Preferably the cone may be hollow or made from a solid material. The cone may be made from a flat plate which is rolled to form a cone shape.

The sleeve may be formed from metal, plastic, or any suitable material.

Preferably the sleeve has an erosion resistant coating. The erosion resistant coating may comprise chrome plating, chemical deposition and/or welded overlay coatings such as Inconel™. The erosion resistant coating may comprise tungsten carbide or a nickel plated layer. The erosion resistant coating may be applied using a chemical vapour deposition or high velocity oxygen fuel spray technique.

Preferably the meter body throughbore may have an inner diameter approximately the same as the inner diameter of pipe work to which the flow measurement apparatus is connected.

Preferably the flow measurement apparatus may be connected to a control unit to monitor the fluid flow rates. The control unit may monitor the position of the sleeve. The control unit may control and/or set the position of the sleeve.

Preferably seals are provided between the outer surface of the sleeve and the inner surface of the fluid flow path of the meter body to prevent fluid egress between the outer surface of the sleeve and the inner surface of the fluid flow path.

According to a second aspect of the invention, there is provided a flow measurement apparatus comprising
a meter body comprising a throughbore with a fluid flow path;
a flow displacement member;
a sleeve movably mounted within the fluid flow path;
a mechanism operable to effect axial movement of the sleeve between at least two axial positions within the fluid flow path to select a predetermined flow rate measurement range.

By providing a flow measurement apparatus with a movable sleeve which is capable of being axially moved between at least two axial positions within the fluid flow path different flow areas may be provided in the fluid flow path which may facilitate the accurate measurement of different flow rate ranges. This may provide a flow measurement apparatus with increased reliability, accuracy and efficiency.

Preferably the mechanism is configured to allow accurate positioning of the sleeve in the fluid flow path. The use of a mechanism to control and/or set the positioning of the sleeve from outside the fluid flow path avoids dismantling of the apparatus to select a different flow rate measurement range.

Preferably the sleeve is configured to be axially moved from a first position to at least a second position within the fluid flow path. Preferably the sleeve is configured to at least partially enclose the flow displacement member when it is in the first or/and at least second position.

Preferably the flow displacement member comprises a conical cone. The flow displacement member may have a first diverging section and second converging section. The interface between diverging and converging section may form a peripheral edge.

Preferably a first flow area and/or first beta ratio is defined by the distance between the peripheral edge of the displacement member and the inner diameter of the meter body throughbore fluid flow path. Preferably a second flow area and/or first beta ratio is defined by the distance between the peripheral edge of the displacement member and the inner diameter of the sleeve and/or the inner diameter of a throat section of the sleeve.

Preferably a first beta ratio is defined by the ratio of the diameter of the peripheral edge of the displacement member to the inner diameter of the meter body throughbore fluid flow path. Preferably a second beta ratio is defined by the ratio of the diameter of the peripheral edge of the displacement member to the inner diameter of the sleeve and/or the inner diameter of a throat section of the sleeve.

Preferably the mechanism is located outside the fluid flow path and is configured to accurately control and set the axial position of the sleeve in the fluid flow path.

In one embodiment the sleeve is configured to be slidably mounted within the throughbore fluid flow path of the meter body.

The mechanism may be manually, hydraulically, pneumatically, electrically or mechanically actuated.

Preferably the apparatus comprises at least one sensor to accurately detect and/or determine the position of the sleeve within the fluid flow path.

The at least one sensor may be selected from a potentiometer, ohmmeter, gauss meter, ultrasonic sensor and/or distance encoder.

Preferably the mechanism may be configured to monitor and/or track the axial position of the sleeve in the fluid flow path. The mechanism may be coupled to an indicator and/or display to indicate the position of the sleeve.

Preferably the apparatus comprises a control unit. Further preferably the control unit is configured to receive information from the at least one sensor. The control unit is configured be programmable. The control unit may comprise adjustable settings to be calibrated for specific parameters of the fluid, fluid properties, meter body throughbore and the sleeve including flow pressure, differential pressure between an upstream pressure and downstream pressure of a displacement member, flow temperature, sleeve type and dimensions and sleeve mechanism type.

Preferably the control unit is configured to activate an alarm. The alarm may be activated if the sleeve is detected in an incorrect axial position within the fluid flow path or if the sleeve and/or mechanism have not completely moved from the first position to the at least second position.

The control unit may be configured to stop receiving measurements being taken as the sleeve is being moved.

The fluid may be oil, gas, steam, water, waste product or any other suitable fluid.

Embodiments of the second aspect of the invention may include one or more features of the first aspect of the invention or its embodiments, or vice versa.

According to a third aspect of the invention there is provided a method of configuring a flow measurement apparatus comprising:
providing a flow measurement apparatus comprising
a meter body comprising a throughbore with a fluid flow path;
a flow displacement member; and
a sleeve movably mounted within the fluid flow path;
moving the axial position of the sleeve within the fluid flow path from a first position to at least a second position to select a predetermined flow rate measurement range.

Preferably the method may comprise obtaining a beta ratio value for the flow measurement apparatus at the first and/or at least second position.

Preferably the method may comprise calculating a beta ratio value for a desired flow rate measurement and/or flow rate measurement range. The method may comprise determining the axial position of the sleeve required to obtain the desired flow rate measurement and/or flow rate measurement range. The method may comprise moving the axial position of the sleeve within the fluid flow path of the meter body throughbore to the second position which may be the determined axial position of the sleeve required to obtain the desired flow rate measurement and/or flow rate measurement range. The method may comprise setting the axial position of the sleeve at this second position.

Embodiments of the third aspect of the invention may comprise features corresponding to the preferred or optional features of the first or second aspects of the invention or vice versa.

According to a fourth aspect of the invention there is provided a method of operating a flow measurement apparatus comprising:
providing a flow measurement apparatus comprising
a meter body comprising a throughbore with a fluid flow path;
a flow displacement member; and
a sleeve movably mounted within the fluid flow path;
moving the sleeve between two axial positions within the fluid flow path to select a predetermined flow rate measurement range for the flow measurement apparatus.

Preferably the method may comprise detecting and/or identifying the axial position of the sleeve within the fluid flow path at a first axial position. The method may comprise detecting and/or identifying the axial position of the sleeve within the fluid flow path of the meter body throughbore at a second axial position.

Preferably the method may comprise obtaining a beta ratio value for the flow measurement apparatus at a first and/or second axial position.

Preferably the method may comprise calculating the mass and volume flow rate of the fluid at a first and/or second axial position.

Preferably the method may comprise calculating a beta ratio value for a desired flow rate measurement and/or flow rate measurement range. The method may comprise determining the axial position of the sleeve required to obtain the desired flow rate measurement and/or flow rate measurement range and moving the sleeve axially within the fluid conduit to an axial position within the fluid flow path to change the flow rate measurement range to the desired flow rate measurement range.

Embodiments of the fourth aspect of the invention may comprise features corresponding to the preferred or optional features of the first, second or third aspects of the invention or vice versa.

According to a fifth aspect of the invention there is provided a method of operating a flow measurement apparatus comprising
providing a flow measurement apparatus comprising a
a meter body comprising a throughbore with a fluid flow path;
a flow displacement member;
a sleeve movably mounted within the fluid flow path; and
a mechanism operable to effect axial movement of the sleeve;
actuating the mechanism to move the sleeve axially within the fluid flow path between at least two axial positions within the fluid flow path to select a predetermined flow rate measurement range.

Preferably the method may comprise detecting and/or identifying the axial position of the sleeve within the fluid conduit at a first position. The method may comprise detecting and/or identifying the axial position of the sleeve within the fluid conduit at a second position.

Preferably the method may comprise obtaining a beta ratio value for the flow measurement apparatus at a first and/or second position.

Preferably the method may comprise calculating the mass and volume flow rate of the fluid at a first and/or second position.

Preferably the method may comprise calculating a beta ratio value for a desired flow rate measurement and/or flow rate measurement range. The method may comprise determining the axial position of the sleeve within the meter body throughbore fluid flow path required to obtain the desired flow rate measurement and/or flow rate measurement range and actuating the mechanism to move the sleeve axially within the fluid flow path to an axial position within the fluid flow path to change the flow rate measurement range to the desired flow rate measurement range.

Embodiments of the fifth aspect of the invention may comprise features corresponding to the preferred or optional features of the first to fourth aspects of the invention or vice versa.

According to further aspects of the invention, there is provided a flow measurement apparatus and a method of measuring a flow rate substantially as herein described with reference to the appended drawings.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

As discussed in the background to the invention above, it is an object of at least one aspect of the present invention to provide a flow measurement apparatus which is robust, reliable and is capable of changing the beta ratio of the measurement apparatus quickly such that a wide range of flow rates can be accurately measured.

Figure 1A:
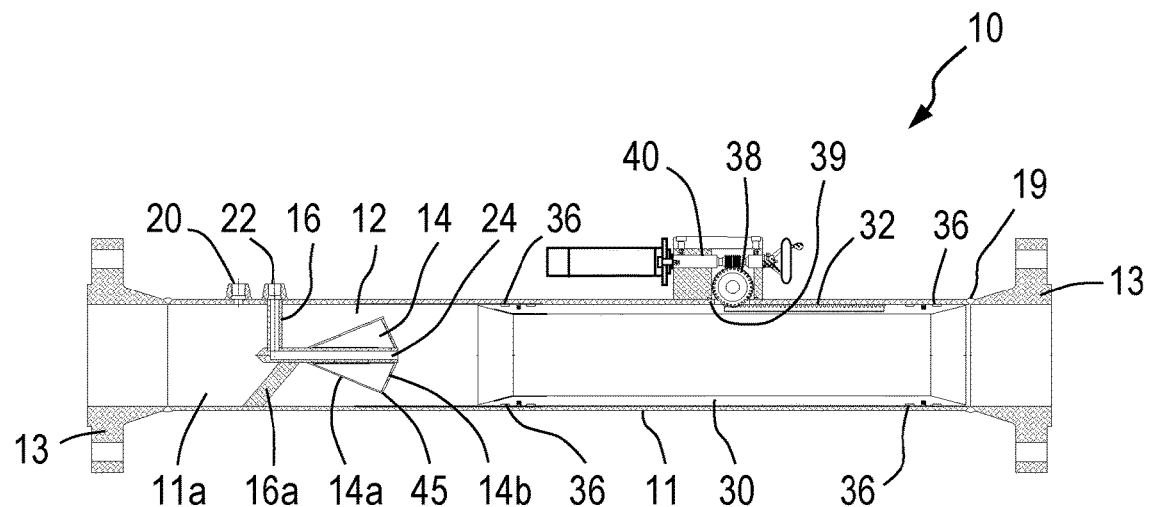
FIGS. 1A and 1B are longitudinal sectional schematic views of a flow measurement apparatus according to a first embodiment of the invention.
Figure 1B:
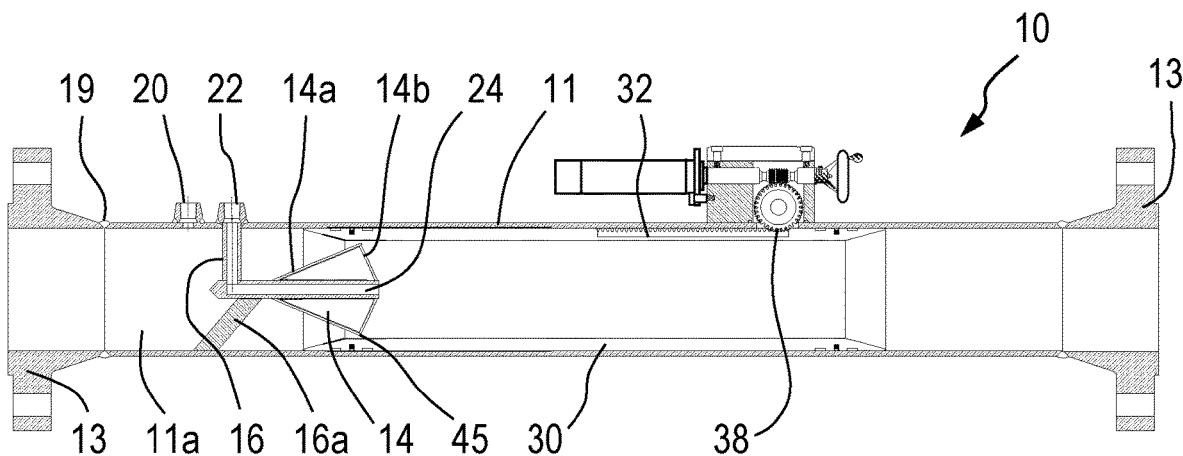

FIGS. 1A and 1B show longitudinal sectional schematic views of flow measurement apparatus 10 according to a first embodiment of the invention. The flow measurement apparatus 10 can be seen to comprise a meter body 11 having a throughbore 11a with a fluid flow path 12 through which fluid is configured to flow. The apparatus 10 is configured to be installed and/or connected in a pipeline structure. Flanges 13 are located at the ends of the meter body 11 and are configured to be secured to a pipeline structure (not shown) via bolts or any other affixing manner such as welding if the material is suitable. Seals 19 are provided between the flange sections 13 and the fluid flow path 12

A flow displacement member 14 is centrally disposed in the fluid flow path 12 and suspended from the meter body 11 via a support 16. The flow displacement member 14 is configured to introduce a pressure difference between the fluid upstream of the displacement member 14 and the fluid downstream. The profile shape of the displacement member is configured to induce a pressure drop in the fluid as it passes over the displacement member in the fluid flow path. In this embodiment the displacement member 14 comprises a diverging cone section 14a and a converging cone section 14b. This is a one example and alternative shaped displacement members suitable for creating a pressure differential in the fluid may be used.

The flow displacement member 14 is manufactured from a flat plate, which is rolled and welded to produce a hollow rolled flat plate conical shape. This rolled plate cone is configured to be less likely to vibrate during flowing conditions. Alternatively, the flow displacement member may be machined from solid material.

The flow displacement member may optionally be supported by an additional support member 16a to reduce vibration of the flow displacement member during fluid flow.

The flow measurement apparatus 10 has a first pressure outlet 20 and a second pressure outlet 22. The first pressure outlet 20 is configured to be in fluid communication with the fluid flow path 12 at a position upstream of the flow displacement member. The second pressure outlet 22 is connected to an interior passageway 24 which extends through the flow displacement member 14 and the support member 16. The second pressure outlet 22 is configured to be in fluid communication with the fluid flow path 12 at a position downstream of the flow displacement member via the interior passageway of the flow displacement member 14 and the support member 16.

An annular sleeve 30 is slidably mounted in the fluid flow path 12. The sleeve is configured to move axially between a first and at least a second position. Although it is shown in FIGS. 1A and 1B that the sleeve is moved between a first (FIG. 1A) a second (FIG. 1B) position, intermediate positions between these positions may be selected.

The sleeve 30 has an outer diameter and the inner diameter. The sleeve is dimensioned such that it is able to slide axially within the inner diameter of the meter body throughbore 11a.

Seals 36 are positioned between the outer surface of the sleeve 30 and the inner surface of the throughbore 11a to prevent fluid egress between the outer surface of the sleeve and the inner surface of the throughbore 11a.

The sleeve 30 comprises a rack section 32 which is configured to mesh with a gear pinion 38 connected to a drive mechanism 40. The gear pinion 38 is configured to extend through a slot 39 in the meter body to mesh with the rack section 32 to axially move the annular sleeve 30 within the fluid flow path 12.

In FIG. 1A the annular sleeve 30 is located in a first position which is at its outermost extended position from the displacement member 14. In this first position the flow area of the fluid is defined by the peripheral edge 45 of the displacement member and the inner diameter of the throughbore 11a.

In FIG. 1B the annular sleeve 30 has been moved to a second position which partially encloses the displacement member 14 within the flow path 12. In this second position the flow area of the fluid is defined by the peripheral edge 45 of the displacement member and the inner diameter of the annular sleeve 30. The sleeve 30 has an inner diameter which is smaller than the inner diameter of the throughbore 11a. This means that the beta ratio of the measurement apparatus has been reduced when the sleeve is moved to the second position.

The flow measurement range of the apparatus depends on the beta ratio value of the apparatus. In the first position, the beta ratio value is the ratio of the diameter of the peripheral edge of flow displacement member and the inner diameter of the throughbore 11a. In the second position, the beta ratio value is the ratio of the diameter of the peripheral edge of flow displacement member and the inner diameter of the sleeve. By knowing the precise value of the beta ratio the mass flow rate and volume flow rate of fluid, flowing through the meter are calculated thus:

$$\text{Mass Flow Rate } Q_m = X * Cd * E_v * Y * (\beta * D)^2 * \sqrt{(\Delta P * \rho_{tp})} \text{ and Volume Flow Rate } Q_v = Q_m / \rho_{tp}$$

Where:

$Q_m$=mass flow rate at the flowing pressure $P_f$ and flowing temperature $T_f$ $Q_v$=volume flow rate at the flowing pressure $P_f$ and flowing temperature $T_f$ X, $X_3$=constant values, determined by the chosen units of measurement.

Cd=Coefficient of Discharge for that specific meter geometry, measured during calibration $$E_v = 1/\sqrt{(1-\beta^2)}$$

$Y = 1 - (0.696 + 0.696 * \beta^4) * \Delta P / (k * P_f * X_3)$, for gases, For Liquids, Y=1

$\beta$=beta ratio=$\sqrt{(D^2 - d^2)}/D$

D=Inside diameter of meter body throughbore d=Diameter of peripheral edge of the displacement member $\Delta P$=Differential Pressure across the meter $P_f$=Fluid absolute pressure at the upstream pressure tap.

k=Gas Isentropic Exponent $\rho_{tp}$=Fluid density at flowing conditions.

Each beta ratio value has a corresponding Coefficient of discharge, which is used along with the measured parameters of Differential Pressure, Flowing Pressure and Temperature to calculate the mass and volume flow rate of the flowing fluid.

A simple visual pointer may be connected to the sleeve and/or the mechanism to detect where the axial position of the sleeve in the fluid flow path. Alternatively a distance encoder sensor such as an optical rotary encoder may be connected to the sleeve and/or the mechanism. This sensor provides real-time position feedback of the position of the sleeve.

Optionally, a graduation scale may be engraved on along the surface of the sleeve to identify the axial position of the sleeve.

FIGS. 2A to 2I show longitudinal sectional schematic views of flow measurement apparatus 100 according to a second embodiment of the invention. The flow measurement apparatus 100 is similar to the apparatus 10 and will be understood from FIGS. 1A and 1B and the accompanying description.

However, flow measurement apparatus 100 has an alternative mechanism used to control the axial movement and positioning of the sleeve.

The flow measurement apparatus 100 can be seen to comprise a meter body 111 having a throughbore 111a with a fluid flow path 112 through which fluid is configured to flow. An annular sleeve 130 is slidably mounted in the fluid flow path 112. The sleeve 130 comprises a series of blind bore holes 132 which are configured to engage locator bolts 108a and 108b. The blind holes are arranged on the outer surface of the sleeve 130 and do not extend through the inner surface of the sleeve 130. The distance between the series of the blind bore holes 132 is configured to locate the sleeve in predetermined positions within the fluid flow path. The entrance throat 134 to the sleeve has a smooth tapered surface.

The meter body 111 comprises a hatch section 102 with a removable hatch cover 104. The hatch cover 104 comprises boreholes 106 through which locator bolts 108a and 108b may extend and securely engage the blind bore holes 132 of the sleeve 130.

Figure 2A:
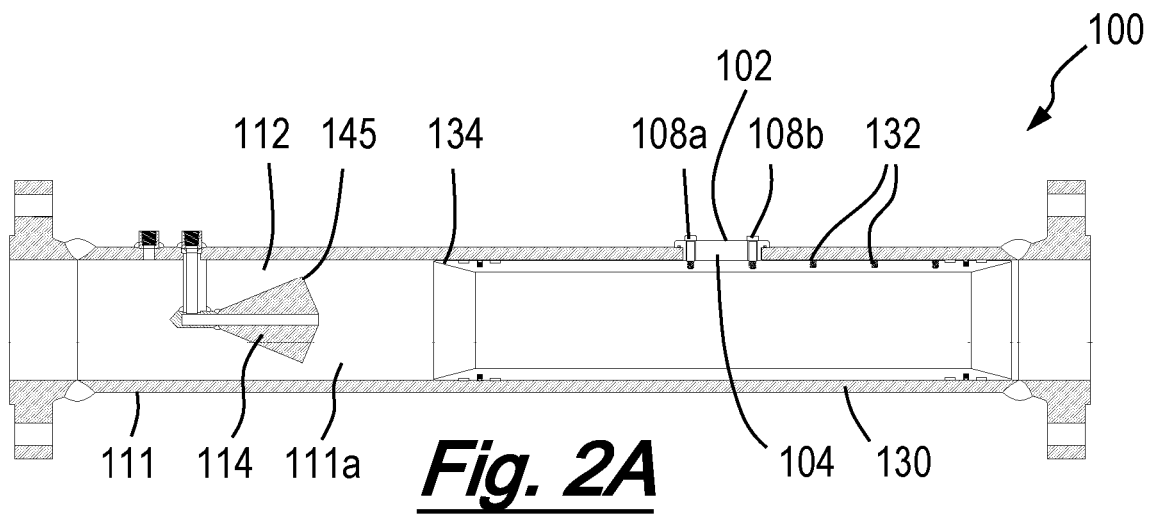
FIGS. 2A to 2I are longitudinal sectional schematic views of a flow measurement apparatus according to a second embodiment of the invention.
Figure 2B:
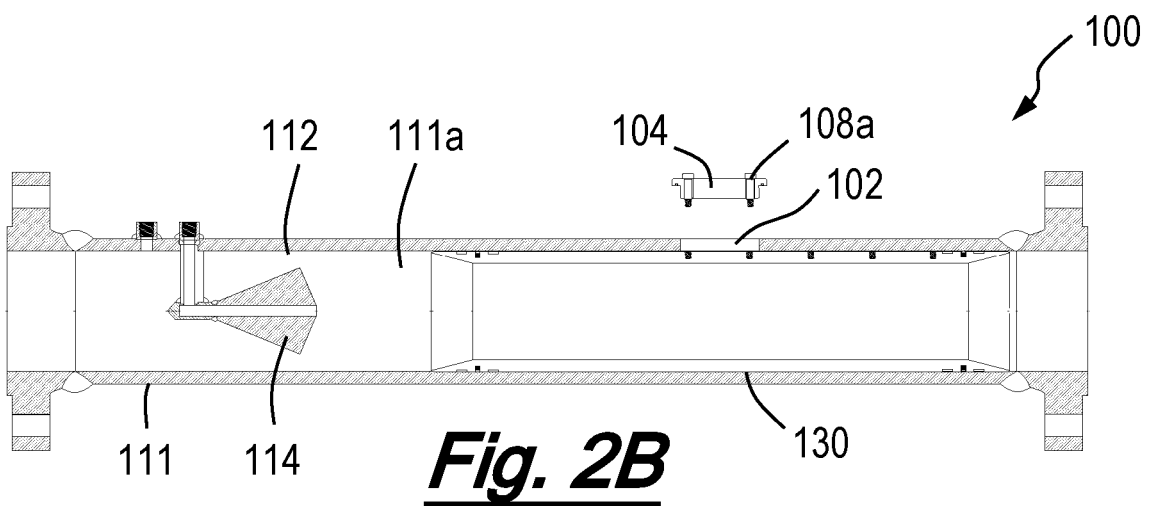
Figure 2C:
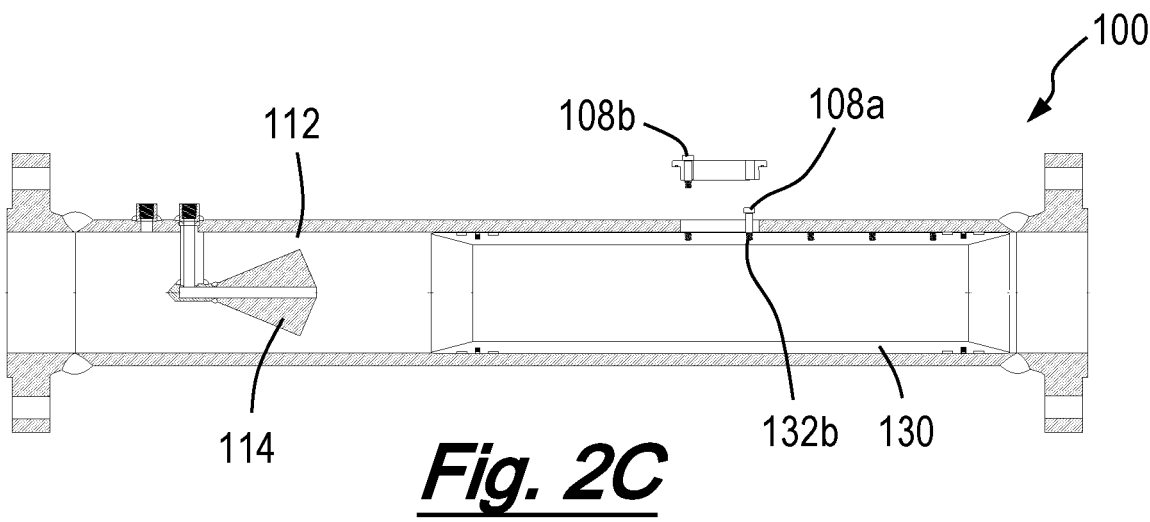

In a first high range beta ratio position shown in FIG. 2A the sleeve is at the outermost extended position downstream from the displacement member 114. In this first position the flow area of the fluid and/or the beta ratio of the measurement apparatus is defined by the peripheral edge 145 of the displacement member and the inner diameter of the throughbore 111a. In this first position the meter is capable of measuring a high range of flow rate.

To avoid or mitigate erosion of the sleeve by grit or sand that may be present in the fluid during use of the meter in this first position, the sleeve is located downstream of the displacement member at a distance equal or greater than the diameter of the throughbore 111a and/or the diameter of the pipework to which the apparatus is connected.

Figure 2D:
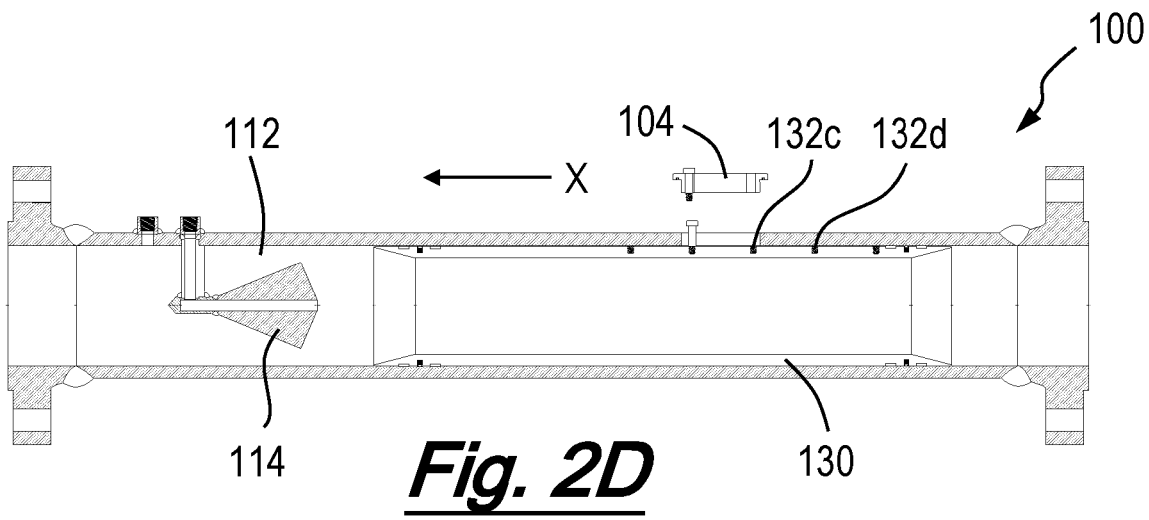
Figure 2E:
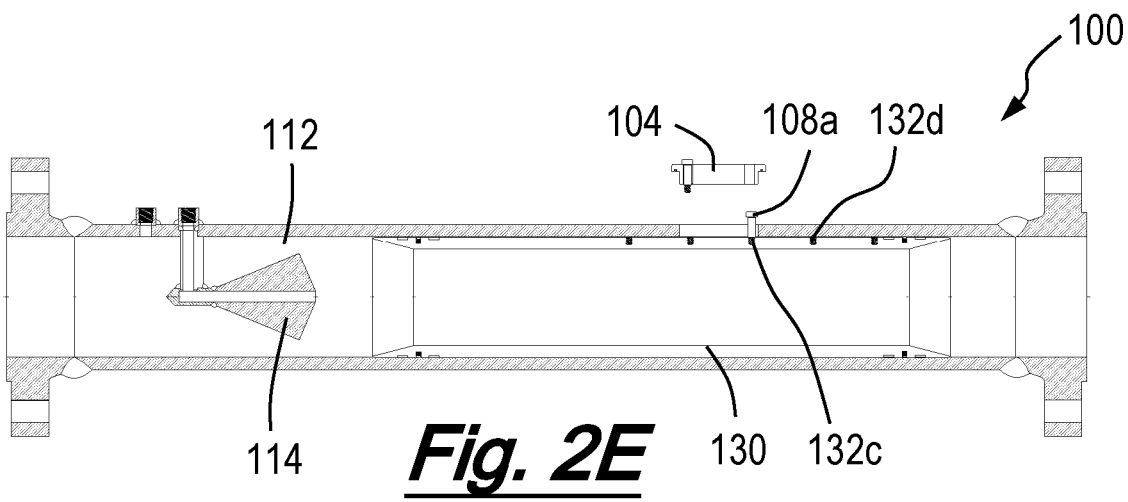
Figure 2F:
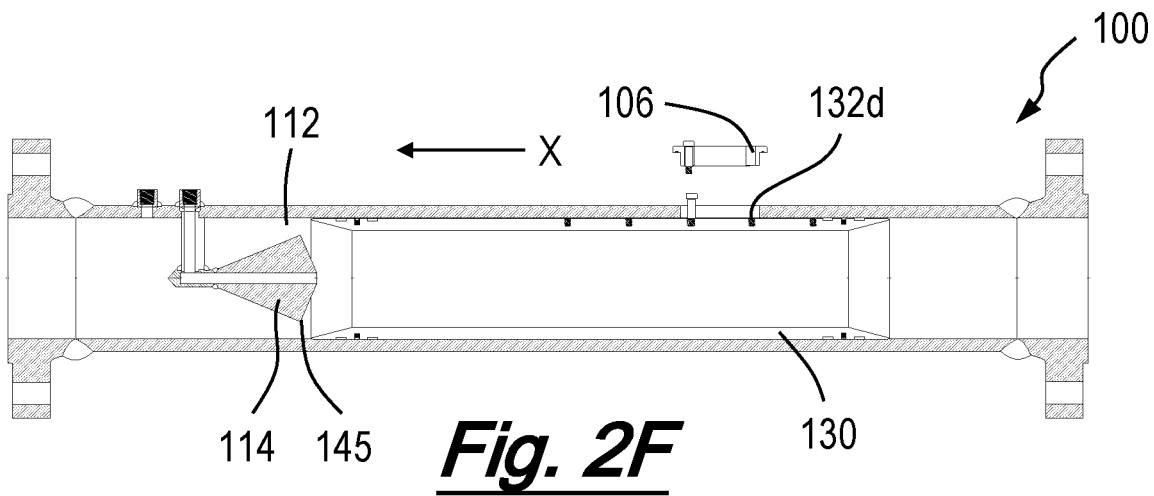
Figure 2G:
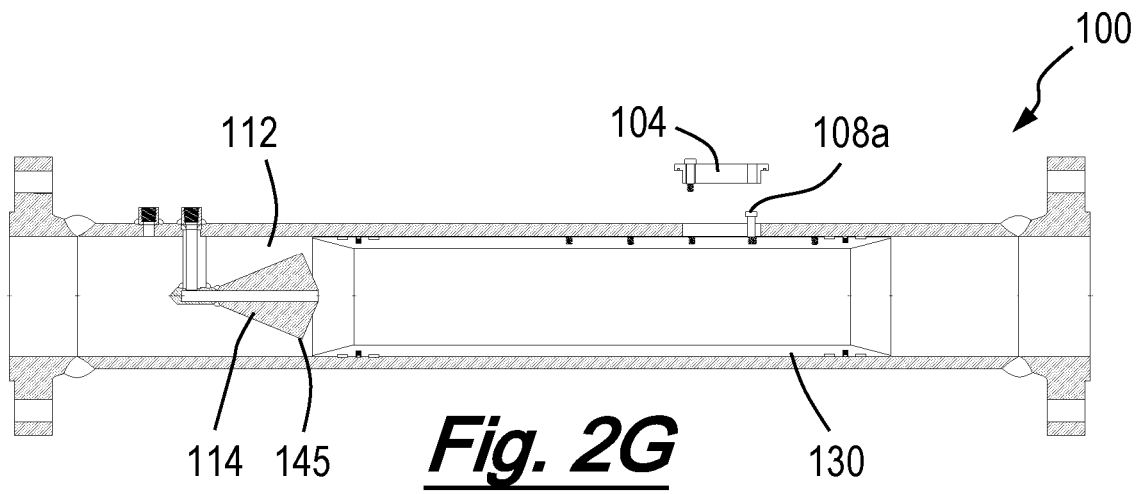
Figure 2H:
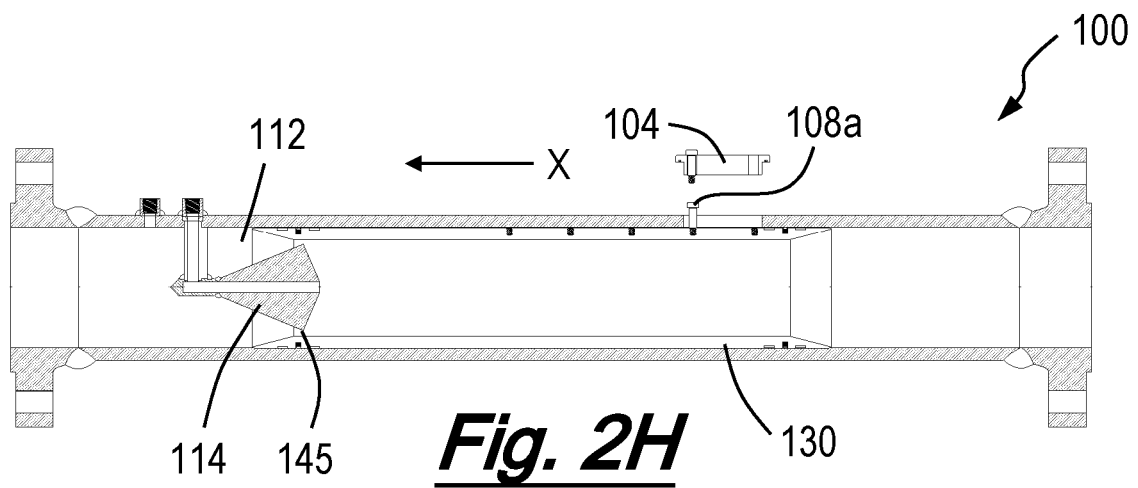
Figure 2I:
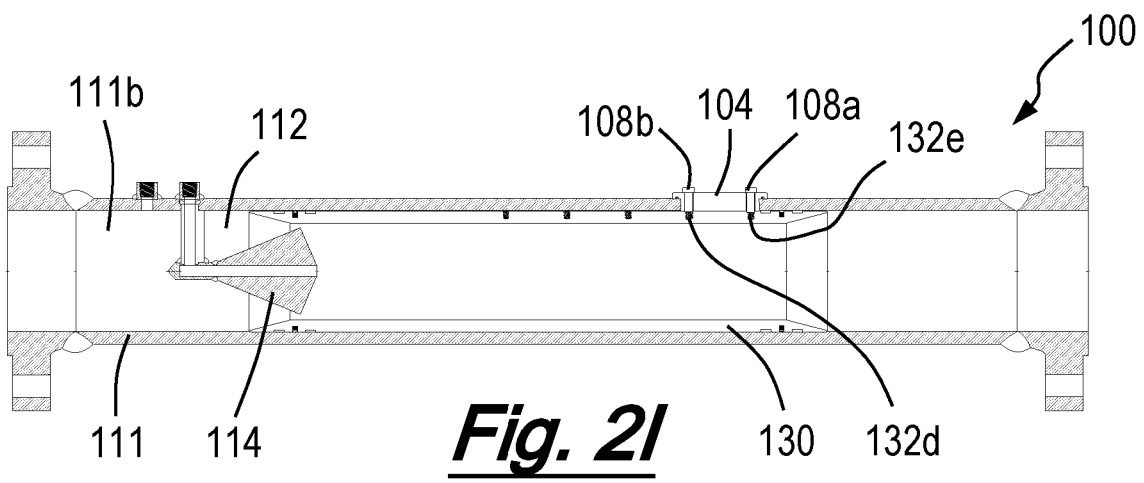

In a second low range beta ratio position shown in FIG. 2I the sleeve partially encloses the displacement member 114 within the flow path 112. In this second position the flow area of the fluid and/or the beta ratio of the measurement apparatus is defined by the peripheral edge 145 of the displacement member and the inner diameter of the annular sleeve 130. The sleeve 130 has an inner diameter which is smaller than the inner diameter of the throughbore 111a. In this second position the meter is capable of measuring a low range of flow rate.

FIGS. 2C to 2I show the stages of adjusting the axial position of the sleeve 130 in the flow path from the first to the second position.

Firstly the hatch cover 104 is removed from the hatch section 102 by removing fixing bolts (not shown). Locator bolt 108a is removed from the hatch section 102 and secured in blind borehole 132b of the sleeve 130. The locator bolt 108a is pulled generally in direction show as arrow X to axially move the sleeve axially closer to the displacement member within the fluid flow path as shown in FIG. 2D The locator bolt 108a is removed from the blind borehole 132b of the sleeve 130 and subsequently secured in blind borehole 132c. The locator bolt 108a is again pulled generally in direction show as arrow X to axially move the sleeve within the fluid flow path as shown in FIG. 2F. The locator bolt 108a is removed from the blind borehole 132c of the sleeve 130 and subsequently secured in blind borehole 132d. The locator bolt 108a is pulled in a direction show as arrow X to axially move the sleeve within the fluid flow path as shown in FIG. 2H.

The locator bolt 108a is removed from the blind borehole 132d of the sleeve 130. The hatch cover is secured to the hatch section of the fluid flow path. Locator bolts 108a and 108b are secured through the boreholes of the hatch cover and are secured in blind boreholes 132c and 132d of the sleeve 130 to secure the sleeve in the second position.

A potentiometer or magnetic position sensor may be used to accurately determine the position of sleeve within the flow path.

Alternatively, a graduation scale may be engraved along the surface of the sleeve to identify the axial position of the sleeve within the fluid flow path and/or relative to the displacement member. The graduation scale and therefore the axial position of the sleeve may observed through the hatch section 102.

FIGS. 3A to 3K show longitudinal section schematic views of flow measurement apparatus 200 according to a third embodiment of the invention. The flow measurement apparatus 200 is similar to the apparatus 10 and will be understood from FIGS. 1A and 1B and the accompanying description. However, flow measurement apparatus 200 has an alternative sleeve throat section profile.

The flow measurement apparatus 200 can be seen to comprise a meter body 211 having a throughbore 211a with a fluid flow path 212 through which fluid is configured to flow. A sleeve 230 comprises a series of blind bore holes 232 which are configured to engage locator bolts 208 and 208b. The blind bore holes are arranged on the outer surface of the sleeve 230 and do not extend through to the inner surface of the sleeve 230. The distance between the series of the blind bore holes 232 is configured to locate the sleeve in predetermined positions within the fluid flow path relative to a displacement member 214.

The meter body 211 comprises a hatch section 202 with a removable hatch cover 204. The hatch cover 204 comprises boreholes 206 through which locator bolts 208 may extend and securely engage the blind bore holes 232 of the sleeve 230.

The entrance throat 250 of the sleeve comprises a series of relatively short, inward aligned steps 250a and 250b. The stepped entrance throat is configured to gradually reduce the inner diameter of sleeve from the inner diameter of the outer step 250a of the entrance throat of the sleeve to the inner diameter of the sleeve. In this example three stepped diameters 250a, 250b and the inner diameter of the sleeve can be seen. However any other number of stepped diameters may be used.

Figure 3A:
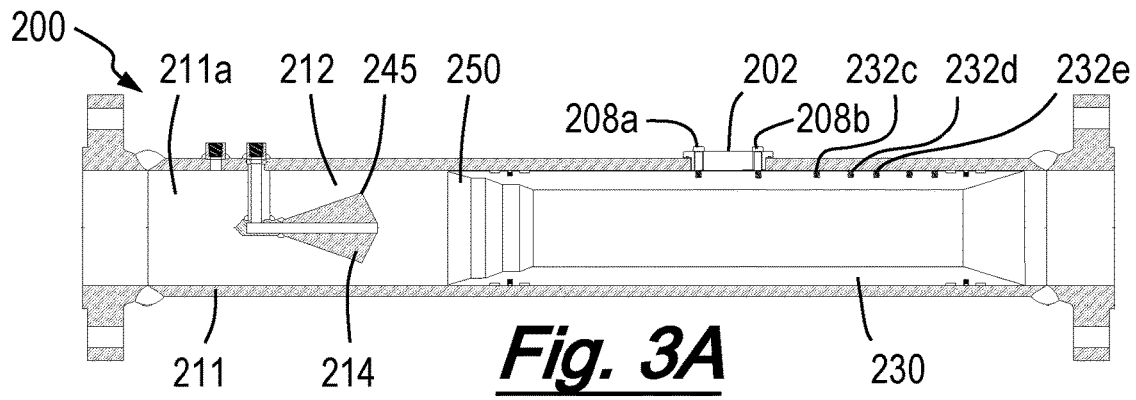
FIGS. 3A to 3K are longitudinal sectional schematic views of a flow measurement apparatus according to a third embodiment of the invention.
Figure 3B:
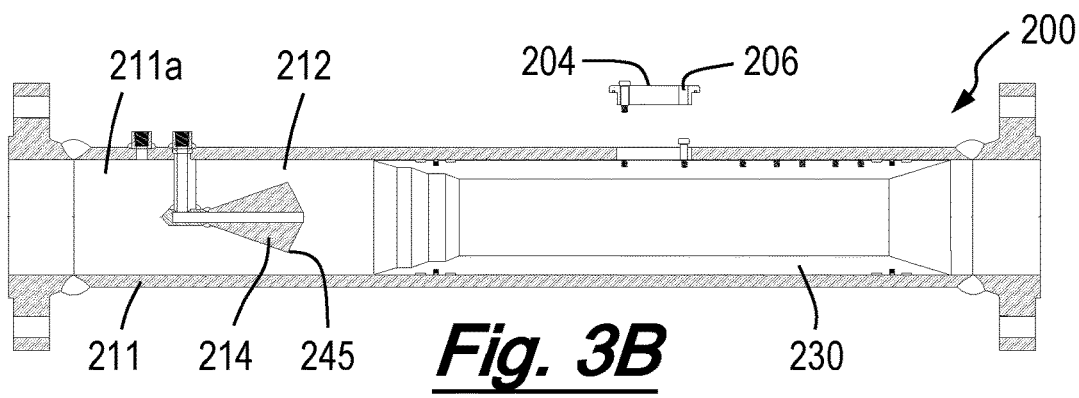
Figure 3C:
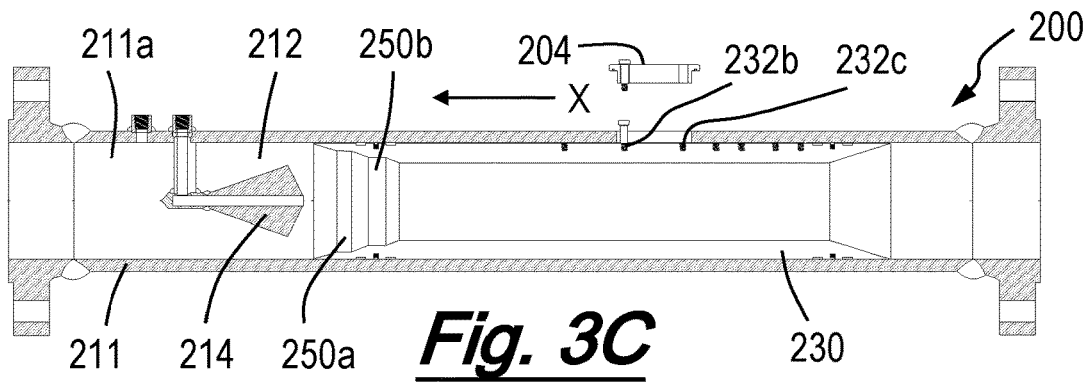
Figure 3D:
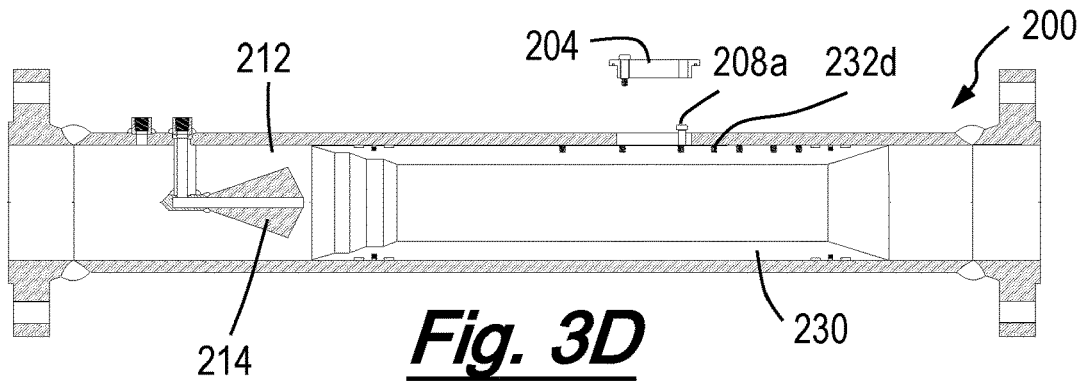

In a first position shown in FIG. 3A the sleeve is at the outermost extended position downstream from the displacement member 214. In this first position the flow area of the fluid is defined by the peripheral edge 245 of the displacement member and the inner diameter of the throughbore 211a. To avoid erosion of the sleeve during use of the meter in this first position the sleeve is located downstream of the displacement member at a distance equal or greater than the diameter of the throughbore 111a and/or the diameter of the pipework to which the apparatus is connected.

FIGS. 3A to 3I show the stages of adjusting the beta ratio of the flow measurement apparatus by changing the axial position of the sleeve 230 in the flow path. Firstly the hatch cover 204 is removed from the hatch section 202 by removing fixing bolts (not shown). Locator bolt 208a is removed from the hatch section 202 and secured in blind borehole 232b of the sleeve 230. The locator bolt 208a is pulled in a direction show as arrow X to axially move the sleeve to a position closer to the flow displacement member.

Figure 3E:
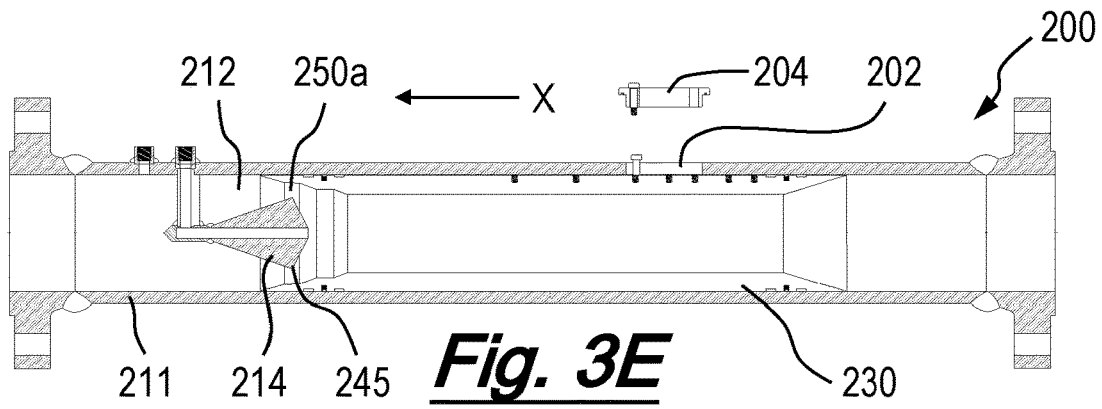
Figure 3F:
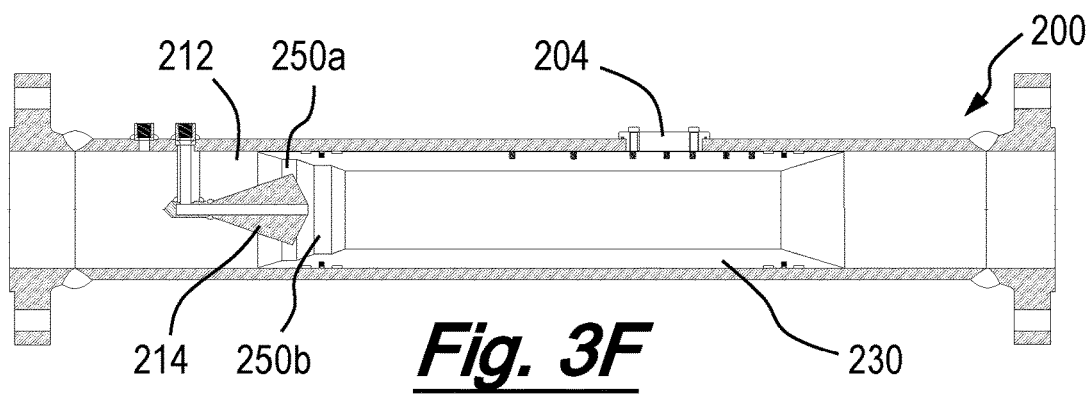
Figure 3G:
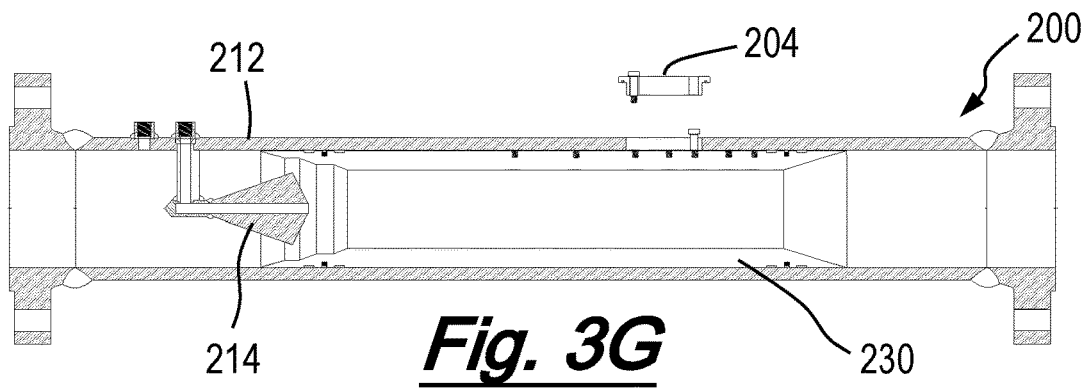
Figure 3H:
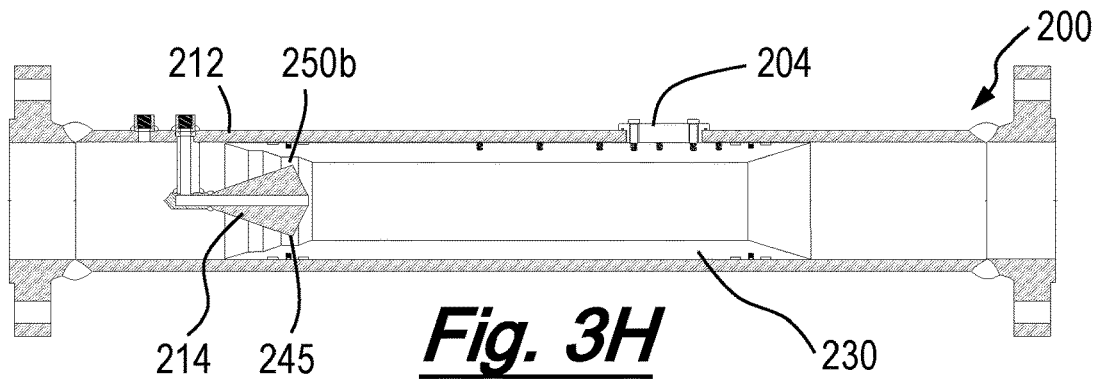
Figure 3I:
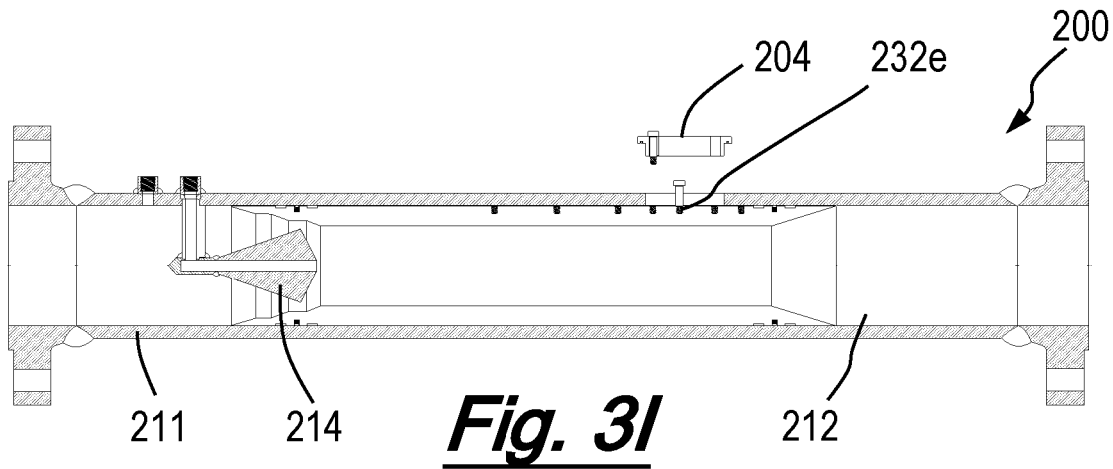
Figure 3J:
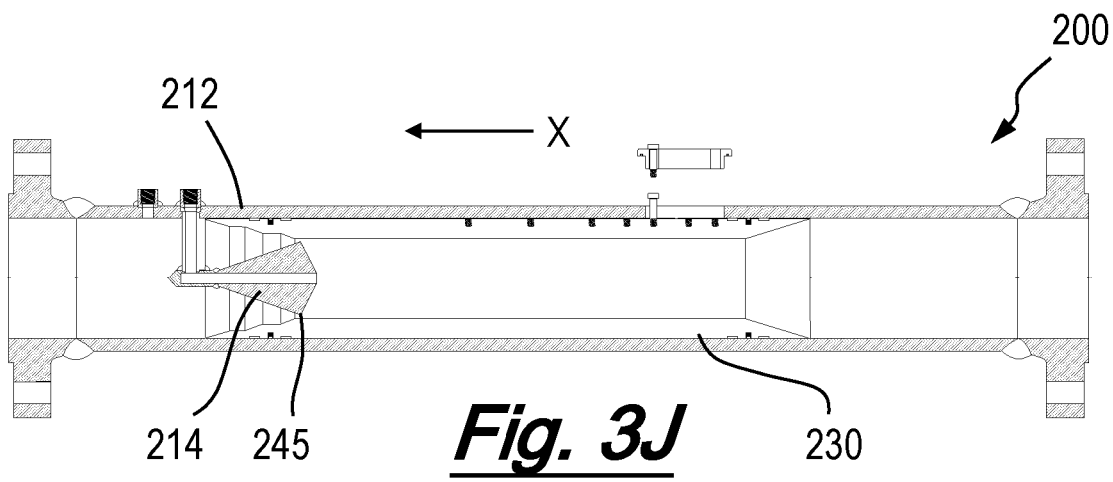
Figure 3K:
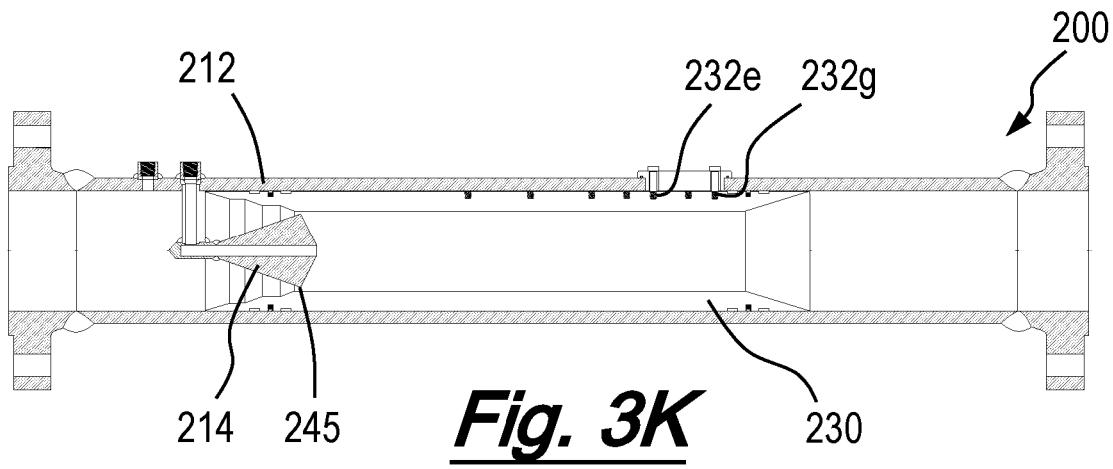

The locator bolt 208a is removed from the blind borehole 232b of the sleeve 230 and subsequently secured in blind borehole 232c. The locator bolt 208a is pulled in a direction show as arrow X to axially move the sleeve within the fluid flow path to a second position as shown in FIG. 3E. In this second position the sleeve is positioned around the flow displacement member such that the peripheral edge 245 of the displacement member and the inner diameter of the first step 250a of the throat section of the annular sleeve 230 define flow area of the fluid. The first step 250a has an inner diameter which is smaller than the inner diameter of the throughbore 211a. This means that the beta ratio of the measurement apparatus has been reduced when the sleeve is moved from the first position as shown in FIG. 3A to the second position as shown in FIG. 3E.

The locator bolt 208a is removed from the blind borehole 232c of the sleeve 230. The hatch cover is secured to the hatch section. Locator bolts 208a and 208b are secured through the boreholes of the hatch cover and are secured in blind boreholes 232c and 232e of the sleeve 230 to secure the sleeve in this second position.

In order to move the sleeve from the second axial position to a third axial position the hatch cover 204 is removed from the hatch section 202. Locator bolt 208a is removed from the hatch section 202 and secured in blind borehole 232d. The locator bolt 208a is pulled in a general direction show as arrow X to axially move the sleeve within the fluid flow path from a second position to a third position. In this third position the sleeve is positioned around the flow displacement member such that the peripheral edge 245 of the displacement member and the inner diameter of the second step 250b of the throat section of the annular sleeve define a flow area for the fluid. The second step 250b has an inner diameter which is smaller than the inner diameter of the first step 250a of the throat section of the sleeve. This means that the beta ratio of the measurement apparatus has been reduced when the sleeve is moved from the second position to a third position.

The locator bolt 208a is removed from the blind borehole 232c of the sleeve 230. The hatch cover 204 is secured to the hatch section 202. Locator bolts 208a and 208b are secured through the boreholes of the hatch cover and are secured in blind boreholes 232d and 232f of the sleeve 230 to secure the sleeve in this third position.

In order to move the sleeve from the third position to a fourth position the hatch cover 204 is removed from the hatch section 202. Locator bolt 208a is removed from the hatch section 202 and secured in blind borehole 232e. The locator bolt 208a is pulled in a direction show as arrow X to axially move the sleeve within the fluid flow path from a third position to a fourth position. In this fourth position the sleeve is positioned around the flow displacement member such that the peripheral edge 245 of the displacement member and the inner diameter of the sleeve define a flow area for the fluid. The inner diameter of the sleeve has a diameter which is smaller than the inner diameter of the second step 250b of the throat section of the sleeve. This means that the beta ratio of the measurement apparatus has been reduced when the sleeve is moved from the third position to the fourth position.

The locator bolt 208a is removed from the blind borehole 232e of the sleeve 230. The hatch cover is secured to the hatch section. Locator bolts 208a and 208b are secured through the boreholes of the hatch cover and are secured in blind boreholes 232e and 232g of the sleeve 230 to secure the sleeve in this fourth position.

An externally mounted resistor or magnetic type position indicator may be used to accurately indicate the position of the sleeve in the fluid flow path.

As an example, an externally mounted resistor may be configured to provide a different resistance reading when the sleeve is located in each of the first to fourth positions. The resistor may be configured to have a resistance reading of between 1 and 1.5 Ohms when the sleeve is located in the first position where the flow area of the fluid is defined by the peripheral edge 245 of the displacement member and the inner diameter of the meter body throughbore 211a.

The resistor may be configured to have a resistance reading of between 2.0 to 2.5 Ohms when the sleeve is located in the second position where the sleeve is positioned around the flow displacement member such that the peripheral edge 245 of the displacement member and the inner diameter of the first step 250a of the throat section of the annular sleeve 230 define flow area of the fluid.

The resistor may be configured to have a resistance reading of between 3.0 to 3.5 Ohms when the sleeve is positioned around the flow displacement member such that the peripheral edge 245 of the displacement member and the inner diameter of the second step 250b of the throat section of the annular sleeve define a flow area for the fluid.

The resistor may be configured to have a resistance reading of between 4.0 to 4.5 Ohms when the sleeve is positioned around the flow displacement member such that the peripheral edge 245 of the displacement member and the inner diameter of the sleeve define a flow area for the fluid.

If a measured resistance reading is 3.8 ohms, then the sleeve is positioned midway between the third and fourth positions. The control unit may be configured to ignore flow readings when the sleeve is located midway between the any of the predetermined first to fourth positions and only measure flow readings when positioned at the first to fourth positions. Therefore, reading will only be measured if the resistor reading is between 1 and 1.5 Ohms, 2 and 2.5 Ohms, 3 and 3.5 Ohms, 4 and 4.5 Ohms and will be ignored at all other resistance levels to mitigate inaccurate measurements when the sleeve is in one of the correct positions. The above resistance readings are provided as an example and alternative resistor readings and/or settings may be used. It will be clear that certain selected above steps may be reversed to the change the position of the sleeve from the fourth to the first positions or intermediate positions therebetween.

Figure 4A:
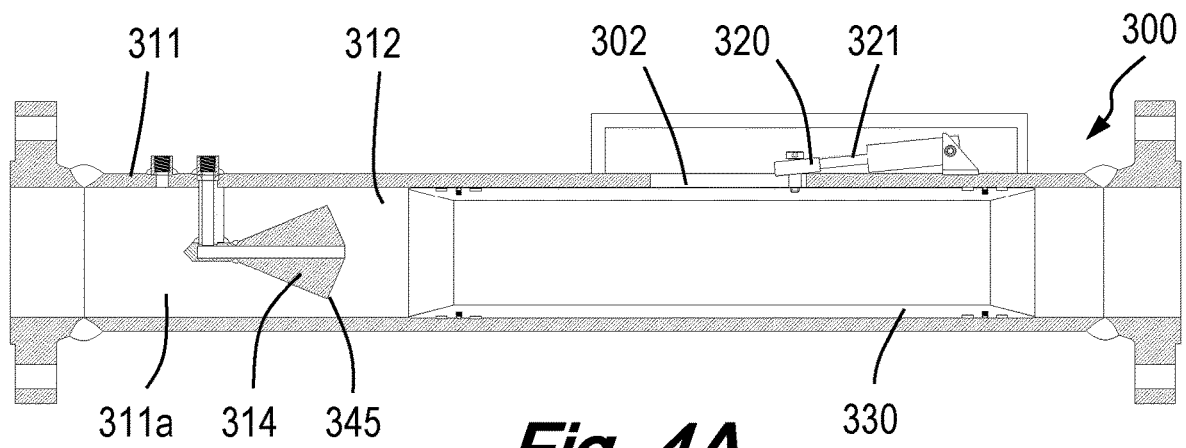
FIGS. 4A and 4B are longitudinal sectional schematic views of a flow measurement apparatus according to a fourth embodiment of the invention.
Figure 4B:
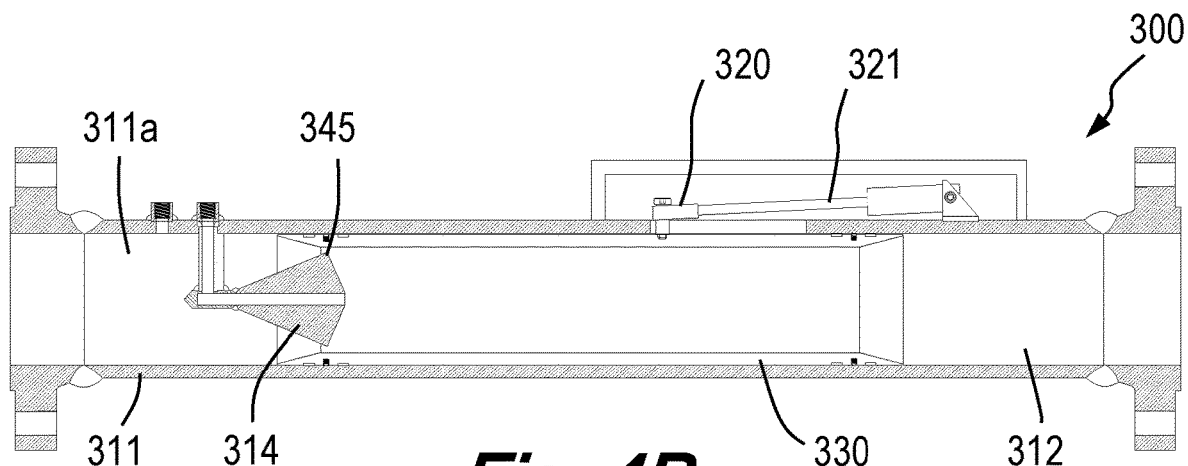

FIGS. 4A and 4B shows longitudinal section schematic views of flow measurement apparatus 300 according to a fourth embodiment of the invention. The flow measurement apparatus 300 is similar to the apparatus 10 and will be understood from FIGS. 1A and 1B and the accompanying description. However, flow measurement apparatus 300 has an alternative mechanism used to control the axial movement of the sleeve.

The flow measurement apparatus 300 can be seen to comprise a meter body 311 having a throughbore 311a with a fluid flow path 312 through which fluid is configured to flow. The flow path 312 comprises a hatch section 302 through which a coupling 320 of an actuator arm 321 extends. The sleeve 330 is connected to the coupling 320 such that activation of the actuator arm 321 axially moves the sleeve axially within the fluid flow path.

The actuator arm 321 is configured to move between an innermost retracted position as shown in FIG. 4A and an outermost extended position as shown in FIG. 4B. The arm 321 may be moved to an intermediate position between the innermost retracted position and outermost extended positions.

In FIG. 4A the annular sleeve 330 is shown in a first position where the actuator arm 321 is retracted to its innermost position such that the sleeve is axially displaced away from the displacement member 314. In this first position the flow area of the fluid is defined by the peripheral edge 345 of the displacement member and the inner diameter of the fluid flow path of throughbore 311a of the meter body. This provides a first beta ratio valve for the measurement apparatus which allows a first range of flow rates to be measured.

In FIG. 4B the annular sleeve 330 is shown in a second position where the actuator arm 321 is extended to it outermost position such that the sleeve 330 partially encloses the displacement member 314 within the flow path 312. In this second position the flow area of the fluid is defined by the peripheral edge 345 of the displacement member and the inner diameter of the annular sleeve 330. The sleeve 330 has an inner diameter which is smaller than the inner diameter of the throughbore 311a. This provides a second beta ratio of the measurement apparatus which allows a second range of flow rates to be measured.

Figure 5A:
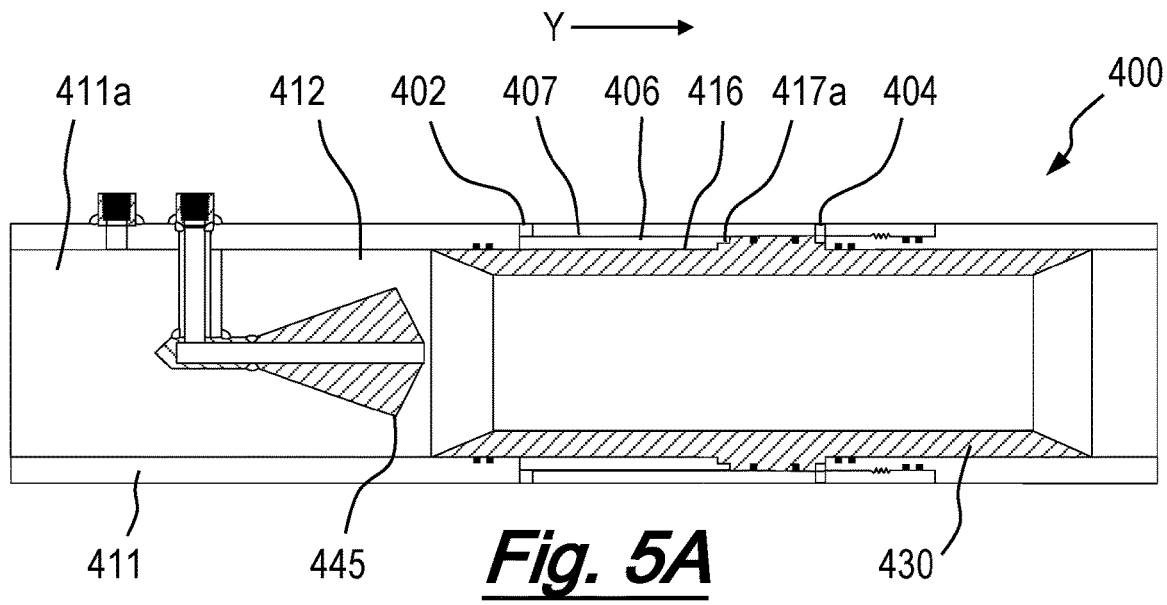
FIGS. 5A and 5B are longitudinal sectional schematic views of a flow measurement apparatus according to a fifth embodiment of the invention.
Figure 5B:
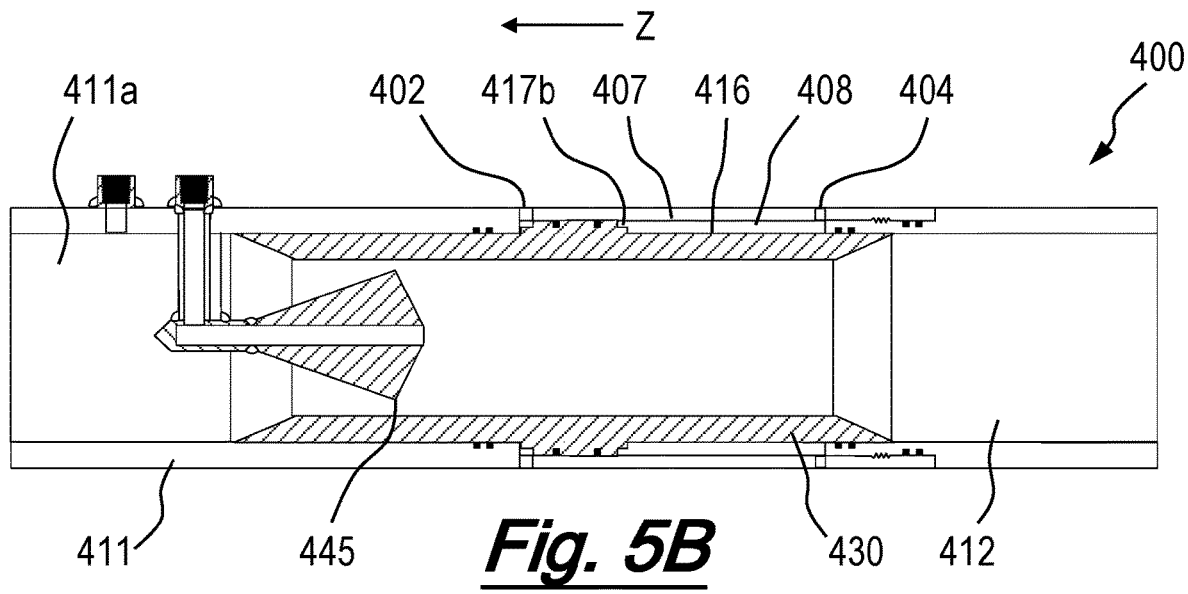

FIGS. 5A and 5B shows longitudinal section schematic views of flow measurement apparatus 400 according to a fifth embodiment of the invention. The flow measurement apparatus 300 is similar to the apparatus 10 and will be understood from FIGS. 1A and 1B and the accompanying description. However, flow measurement apparatus 400 has an alternative mechanism used to control the axial movement of the sleeve.

The flow measurement apparatus 400 can be seen to comprise a meter body 411 having a throughbore 411a with a fluid flow path 412 through which fluid is configured to flow. The meter body 411 comprises a first pressure port 402 and a second pressure port 404. The first pressure port 402 is configured to be in fluid communication with a first differential fluid area 406 defined by the outer surface 416 of the sleeve 430, a raised edge 417a of the outer surface of the sleeve 430 and a stepped channel 407 on the inner surface of the throughbore 411a of the meter body.

The second pressure port 404 is in fluid communication with a second differential fluid area 408 defined by the outer surface 416 of the sleeve 430, a raised edge 417b of the outer surface of the sleeve 430 and a stepped channel 407 on the inner surface of the throughbore 411a of the meter body.

The first pressure port 402 and the first differential fluid area 404 are operable to function as a pressure activated piston to move the sleeve 430 in a first direction generally shown as arrow Y. The second pressure port 404 and the second differential fluid area are operable to function as a pressure activated piston to move the sleeve is a second direction generally shown as arrow Z.

In FIG. 5A a pressure source (not shown) is applied to the first pressure port 402. The increase in pressure acts on the differential area 406 and moves the annular sleeve to a first position shown in FIG. 5A, such that the sleeve is axially displaced away from the displacement member 414. In this first position the flow area of the fluid is defined by the peripheral edge 445 of the displacement member and the inner diameter of the throughbore 411a. The throughbore 411a has an inner diameter which is larger than the inner diameter of the sleeve. This provides a first beta ratio value of the measurement apparatus which allows a first range of flow rates to be measured.

In FIG. 5B a pressure source (not shown) is applied to the second pressure port 404. The increase in pressure acts on the differential area 408 and moves the annular sleeve axially within fluid flow path to a second position shown in FIG. 5B, such that the sleeve partially encloses the displacement member 414 within the flow path 412. In this first position the flow area of the fluid is defined by the peripheral edge 445 of the displacement member and the inner diameter of the annular sleeve 430. The sleeve 430 has an inner diameter which is smaller than the inner diameter of the meter body throughbore 411a. This provides a second beta ratio value for the measurement apparatus which allows a second range of flow rates to be measured.

Optionally a spring such as metallic or gas spring may be coupled between the meter body and the annular sleeve to act as a fail-safe mechanism to move the sleeve to a predetermined safe position in the event of a leak in the pressure source.

FIGS. 6A to 6K show longitudinal sectional schematic views of flow measurement apparatus 500 according to a sixth embodiment of the invention. The flow measurement apparatus 500 is similar to the apparatus 200 and will be understood from FIGS. 3A to 3K and the accompanying description. However, flow measurement apparatus 500 has an alternative sleeve throat section profile.

The flow measurement apparatus 500 can be seen to comprise a meter body 511 having a throughbore 511a with a fluid flow path 512 through which fluid is configured to flow. The sleeve 530 comprises a series of blind bore holes 532 which are configured to engage locator bolts 508. The blind bore holes are arranged on the outer surface of the sleeve 530 and do not extend through to the inner surface of the sleeve 530. The distance between the series of the blind bore holes 532 is configured to locate the sleeve in predetermined positions within the fluid flow path relative to a displacement member 514.

The entrance throat 550 to the sleeve is tapered. The tapered throat is configured to gradually reduce the inner diameter of sleeve from the inner diameter of the outer edge of the entrance throat of the sleeve to the inner diameter of the sleeve.

Figure 6A:
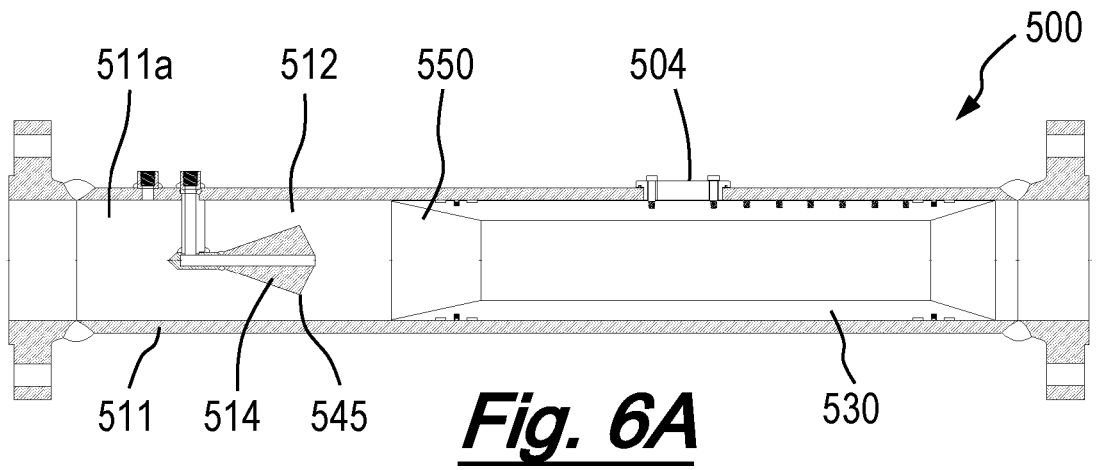
FIGS. 6a to 6O are longitudinal sectional schematic views of a flow measurement apparatus according to a sixth embodiment of the invention.
Figure 6B:
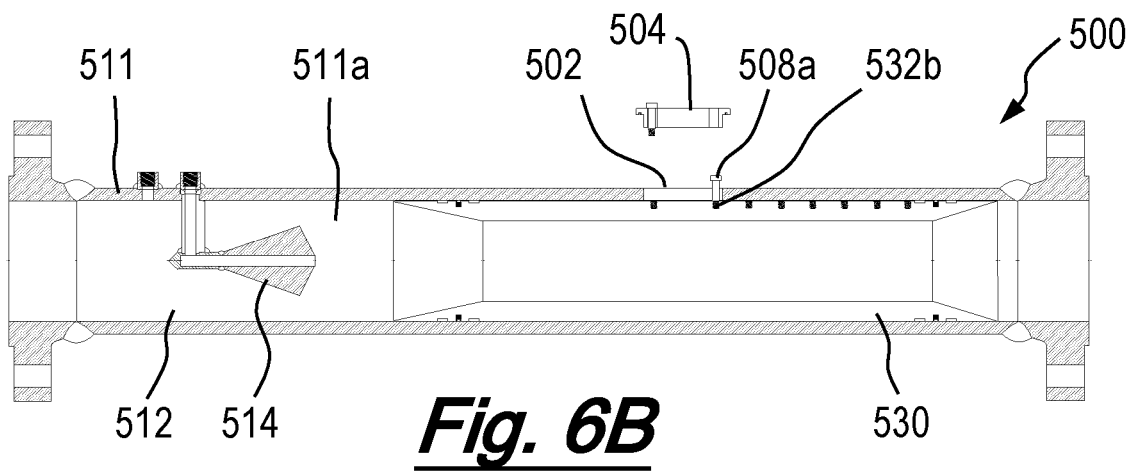
Figure 6C:
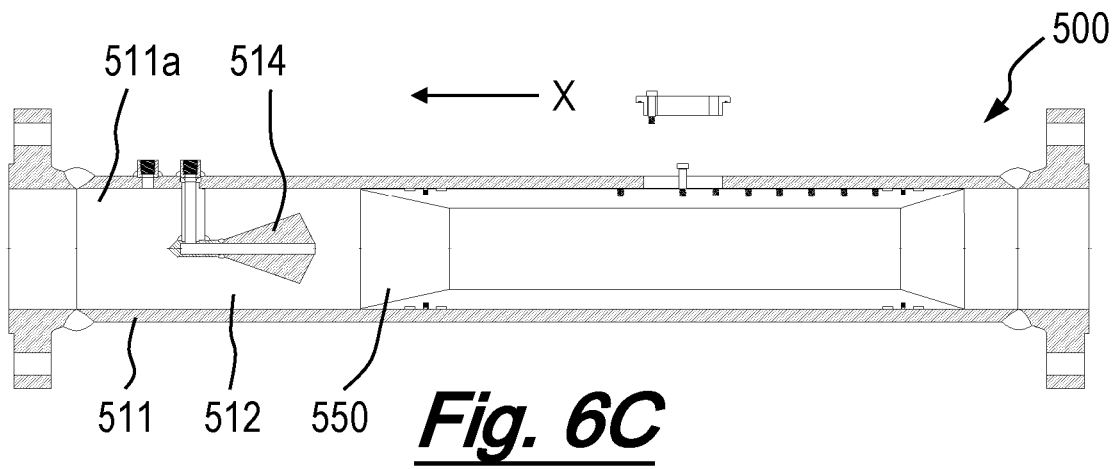
Figure 6D:
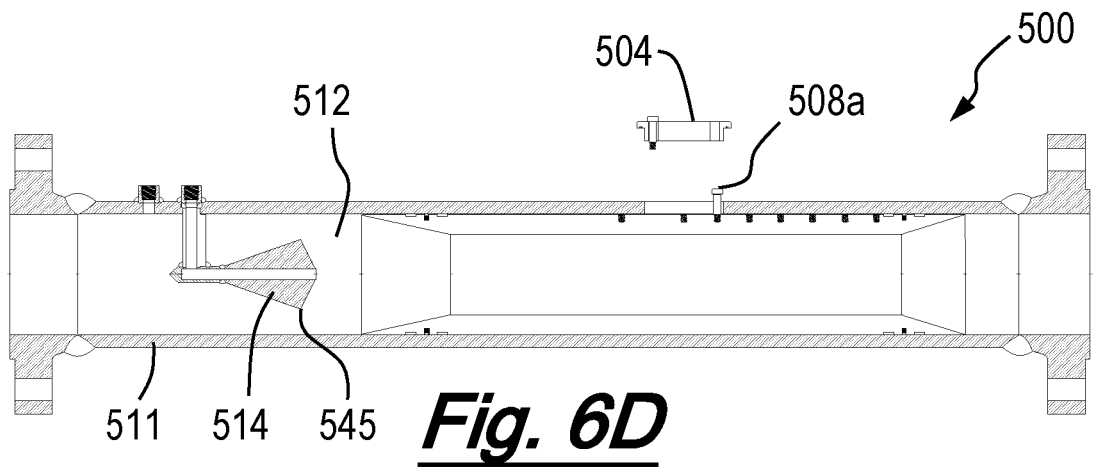

In a first position shown in FIG. 6A the sleeve is at the outermost extended position downstream from the displacement member 514. In this first position the flow area of the fluid is defined by the peripheral edge 545 of the displacement member and the inner diameter of the meter throughbore 511a. To avoid erosion of the sleeve during fluid flow in this first position the sleeve is located downstream of the displacement member at a distance equal or greater than the diameter of the pipe.

Figure 6E:
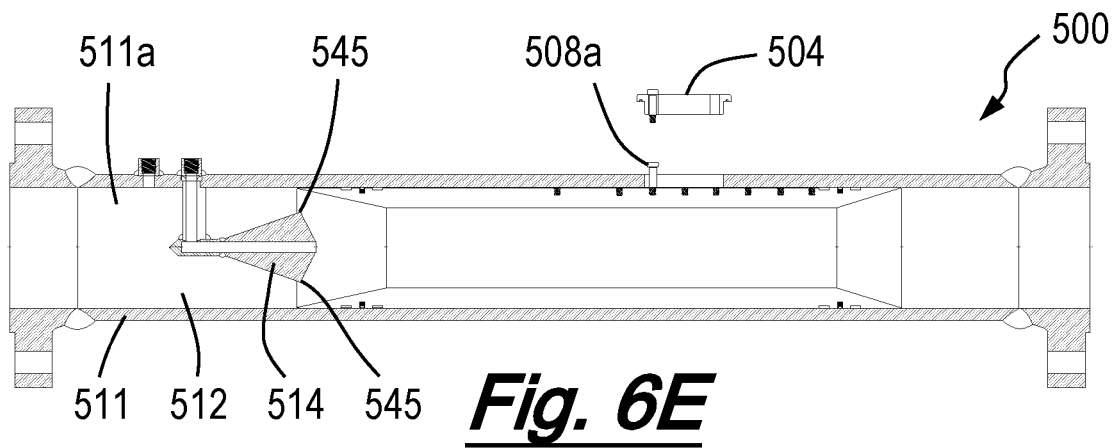
Figure 6F:
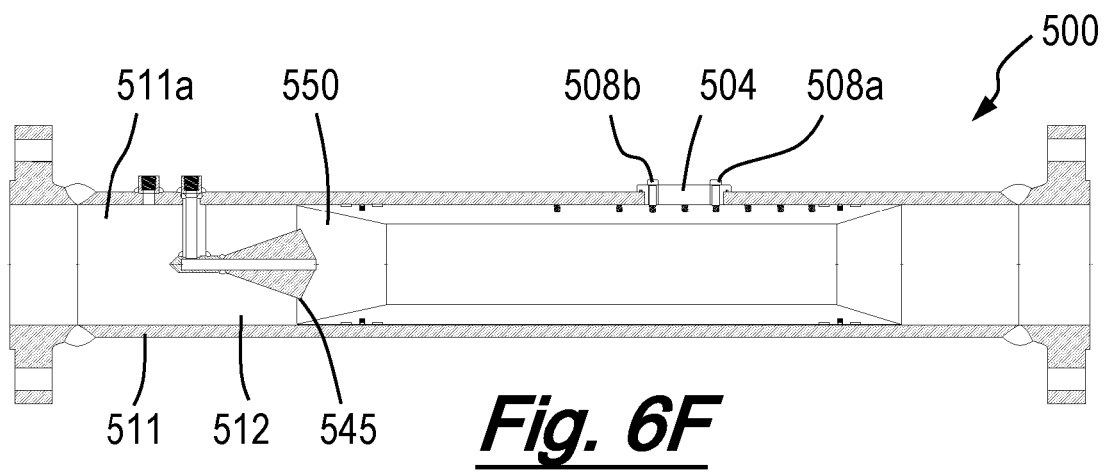
Figure 6G:
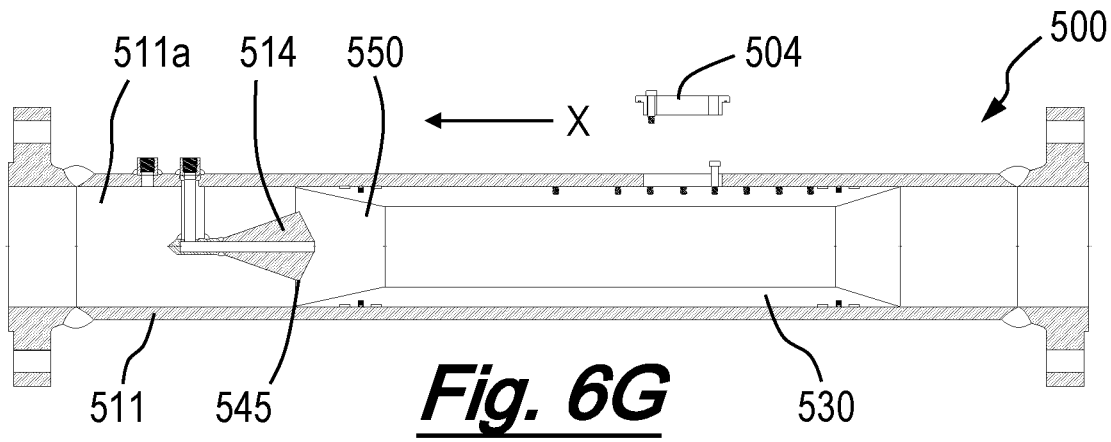
Figure 6H:
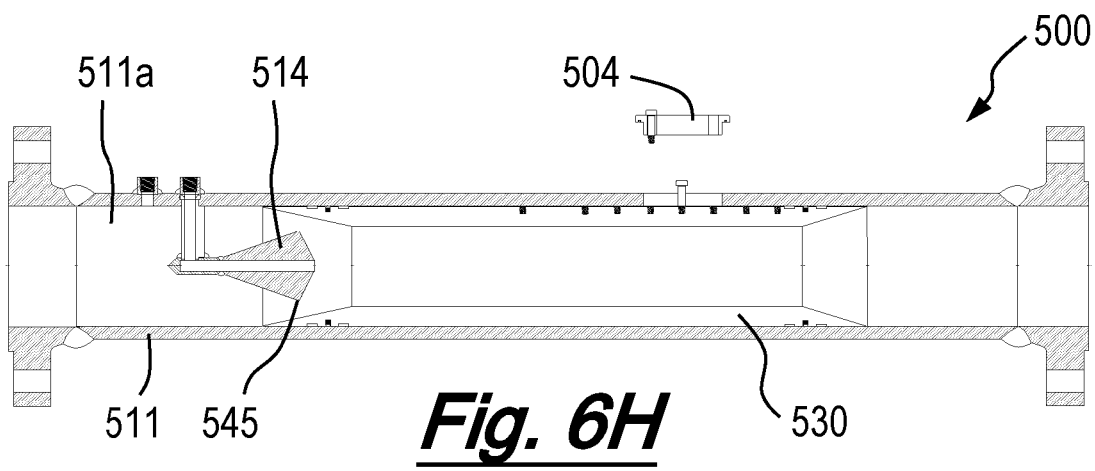
Figure 6I:
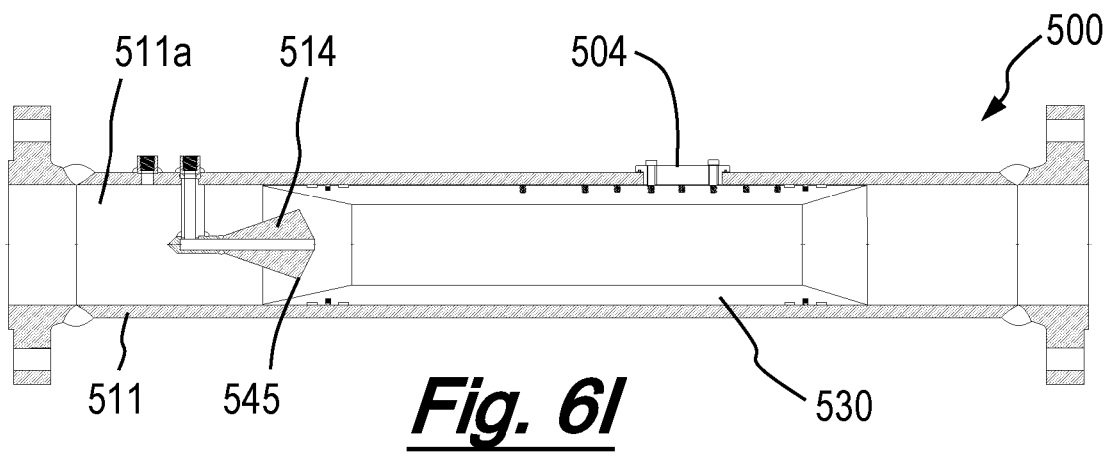
Figure 6J:
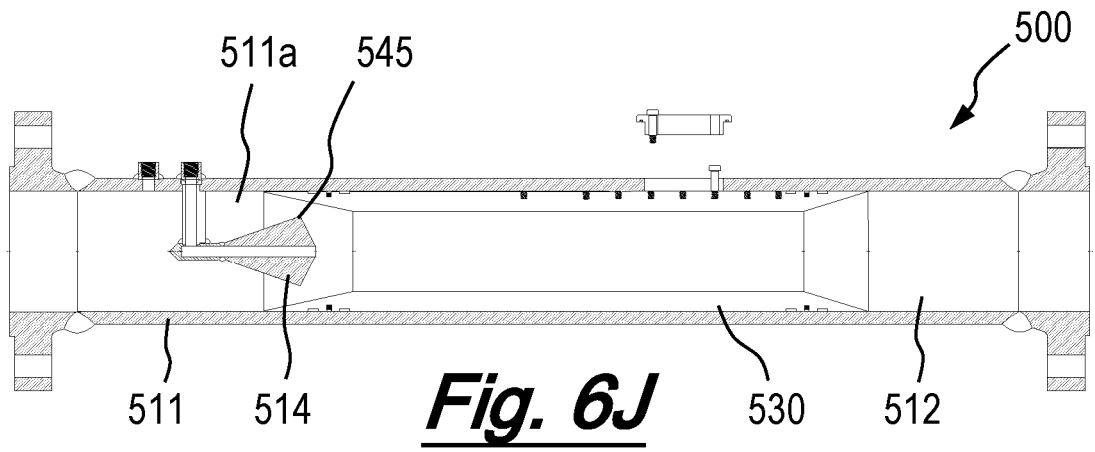
Figure 6K:
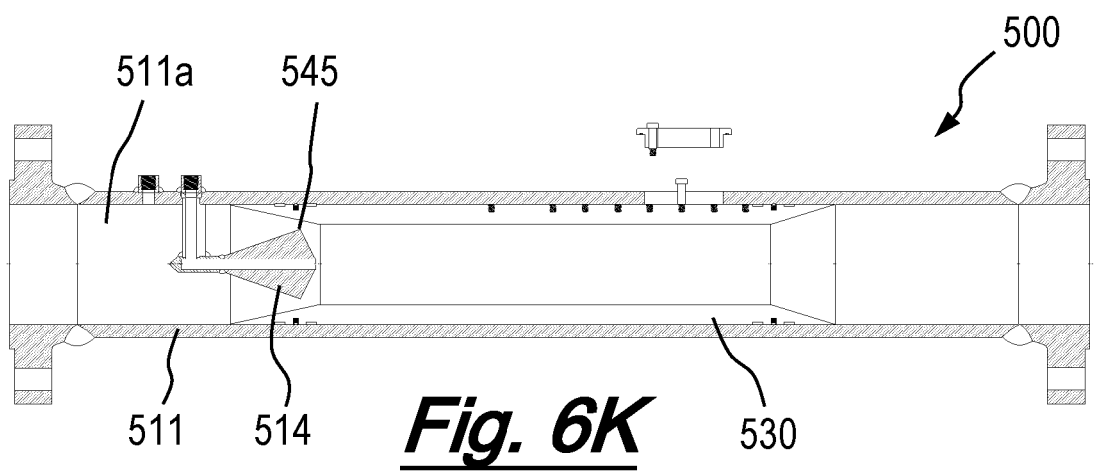
Figure 6L:
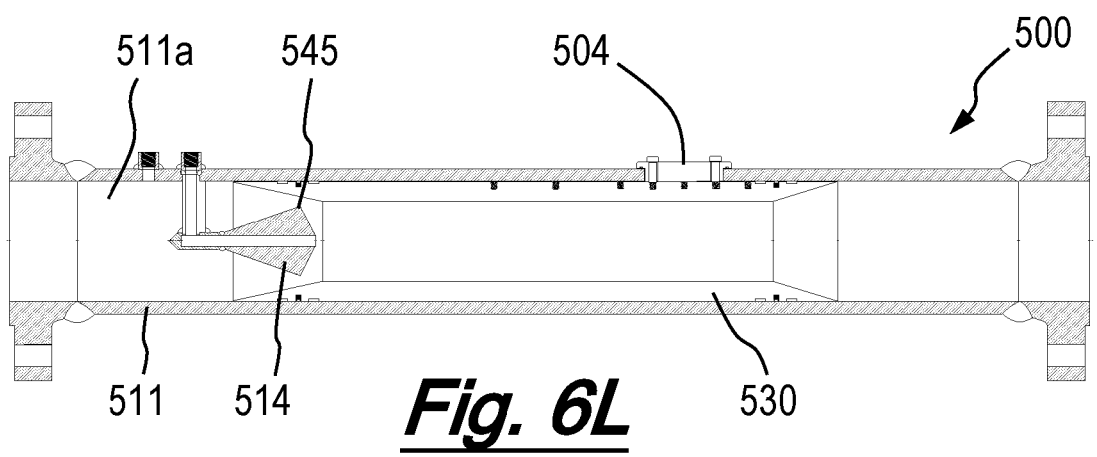
Figure 6M:
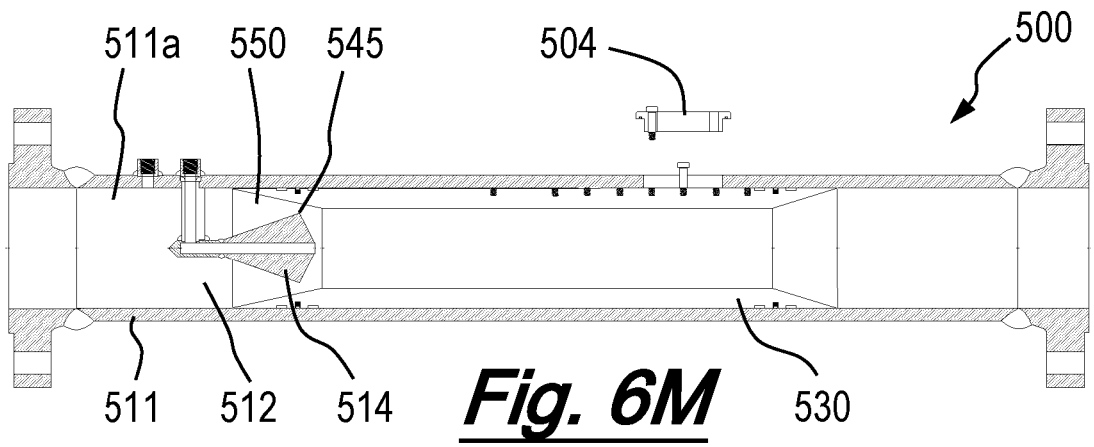
Figure 6N:
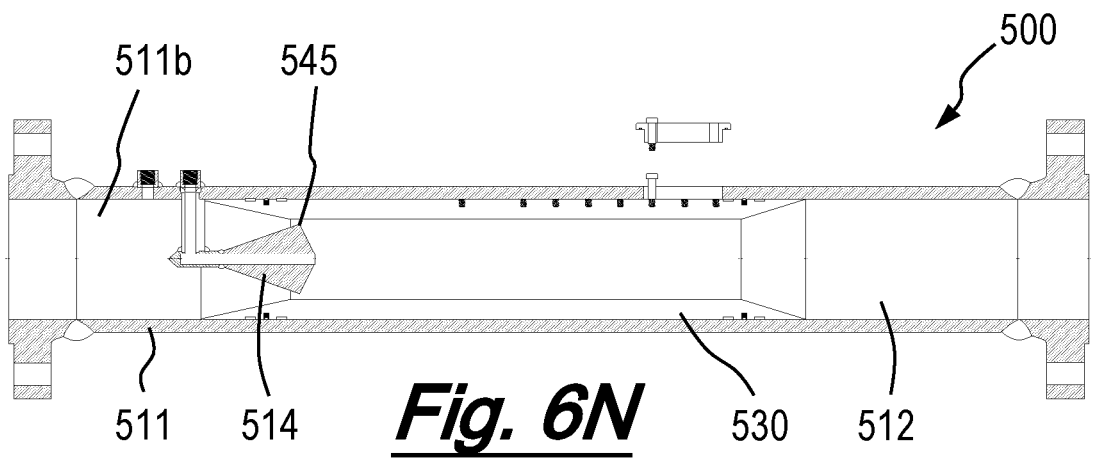
Figure 6O:
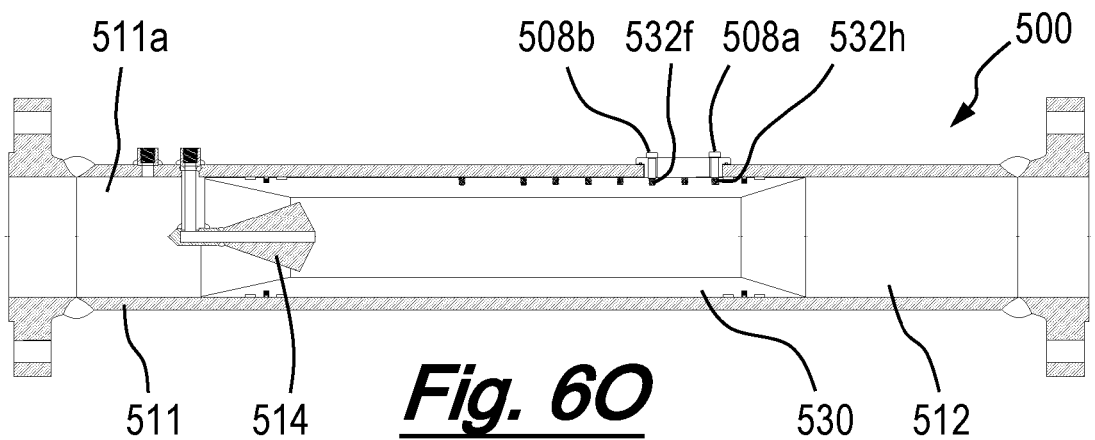

FIGS. 6A to 6N show the stages of adjusting the beta ratio of the flow measurement apparatus by changing the axial position of the sleeve 530 in the flow path. Firstly a hatch cover 504 is removed from a hatch section 502 on the meter body 511 by removing fixing bolts. The locator bolt 508a may engage blind boreholes 532a to 532l of the sleeve 530 and may be pulled in a direction show as arrow X to axially move the sleeve 530 within the fluid flow path 512 in a similar manner as described in the description of FIGS. 3A to 3K.

As shown in FIG. 6E, the sleeve is positioned in a second position where the sleeve is located partially around flow displacement member such that the peripheral edge 545 of the displacement member 514 and the inner diameter of the opening edge of the throat section of the annular sleeve 530 define flow area of the fluid. The opening edge of the throat section of the annular sleeve 530 has an inner diameter which is slightly smaller than the inner diameter of the meter body throughbore 511a. This means that the beta ratio of the measurement apparatus has been reduced when the sleeve is moved from the first position shown in FIG. 6A to the second position shown in FIG. 6E.

Optionally to secure the sleeve in the second position the hatch cover 504 and locator bolts 508a and 508b may be secured through the boreholes and blind boreholes 532c and 532e as shown in FIG. 6F.

Alternatively, the sleeve is moved from the second position to a third position shown in FIG. 6H. The locator bolt 508a engages blind borehole 532e of the sleeve 530 and is pulled in a direction show as arrow X to axially move the sleeve within the fluid flow path from a second position to a third position. In this third position the sleeve is positioned around the flow displacement member such that flow area defined by the peripheral edge 545 of the displacement member and the inner diameter of the throat section is smaller than the flow area in the second position as shown in FIG. 6H. This means that the beta ratio of the measurement apparatus has been reduced when the sleeve is moved from the second position to the third position. The change in the beta ratio allows the measurement apparatus to measure a different flow rate range.

Optionally to secure the sleeve in the third position the hatch cover 504 and locator bolts 508a and 508b may secured through the boreholes and blind boreholes 532d and 532f as shown in FIG. 6I.

The sleeve is moved from the third position to a fourth position shown in FIG. 6K. The locator bolt 508a engages blind borehole 532f of the sleeve 530 and is pulled in a direction show as arrow X to axially move the sleeve within the fluid flow path from a third position to a fourth position. In this fourth position the sleeve is positioned around the flow displacement member such that flow area defined by the peripheral edge 545 of the displacement member and the inner diameter of the throat section is smaller than the flow area in the third position as shown in FIG. 6K. This means that the beta ratio of the measurement apparatus has been reduced when the sleeve is moved from the third position to the fourth position.

Optionally to secure the sleeve in the fourth position the hatch cover 504 and locator bolts 508a and 508b may secured through the boreholes and blind boreholes 532e and 532g as shown in FIG. 6L.

The sleeve is moved from the fourth position to a fifth position shown in FIG. 6N. The locator bolt 508a engages blind borehole 532f of the sleeve 530 and is pulled generally in a direction show as arrow X to axially move the sleeve within the fluid flow path from a fourth position to a fifth position. In this fifth position the sleeve is positioned around the flow displacement member such that the peripheral edge 545 of the displacement member and the inner diameter of the sleeve 530 define a flow area of the fluid. The inner diameter of the sleeve is smaller than the sleeve throat section as shown in FIG. 6N. This means that the beta ratio of the measurement apparatus has been reduced when the sleeve is moved from the fourth position to the fifth position.

The locator bolt 508a is removed from the blind borehole 532f of the sleeve 530. The hatch cover is secured to the hatch section of the meter body. Locator bolts 508a and 508b are secured through the boreholes of the hatch cover and are secured in blind boreholes 532e and 532g of the sleeve 530 to secure the sleeve in this fifth position.

Figure 7:
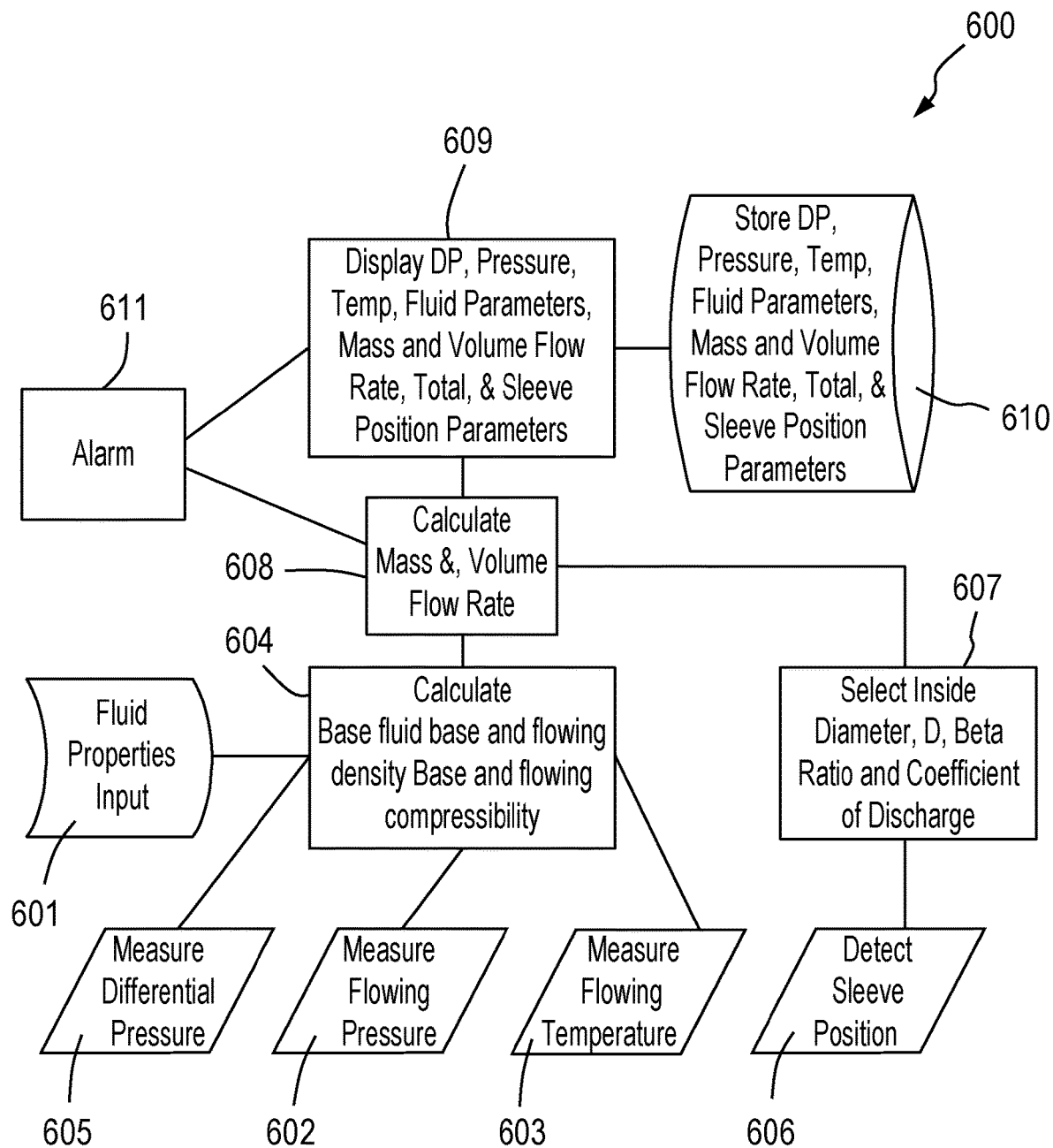
FIG. 7 is block diagram representing steps of calculating the flow rate of a fluid in a production pipeline.

Referring to FIG. 7, a block diagram representing steps of a calculating the flow rate of a fluid in production pipeline is shown. A control unit is programmable and has adjustable settings to allow the measurement apparatus to be calibrated for specific parameters of the fluid, meter body and the sleeve including flow pressure, differential pressure between an upstream and downstream of a displacement member, flow temperature, fluid properties, sleeve type and dimensions, meter body throughbore dimensions, displacement member dimensions and sleeve mechanism type.

As shown in FIG. 7, parameters including fluid properties (Step 601), flow pressure levels (Step 602) and temperature levels (Step 603) are measured and communicated to a control unit.

By providing parameters of the fluid properties (Step 601), the control unit is able to calculate the fluid base density, flowing density, base compressibility and flowing compressibility of the fluid (Step 604).

Pressure measurement readings of the differential pressure between an upstream and downstream of the displacement member (Step 605) are communicated to the control unit. These readings are time stamped and logged by the control unit.

A beta ratio for the measurement device is calculated based on the position of the sleeve within the flow path. The precise axial position of the sleeve within the meter body bore flow path is communicated to the control unit where a real time beta ratio is calculated. The position of the sleeve may be entered into the control unit manually by the user setting its position or automatically by the position of the sleeve being detected using position detection sensors to determine the sleeve position (Step 606).

The beta ratio and coefficient of discharge values are calculated from preset tables parameters including inner diameter of the meter body throughbore, inner diameter of the sleeve and/or inner diameter of a sleeve throat section, beta ratio and coefficient of discharge value for the corresponding preset position of the sleeve within the fluid flow path of the meter body (Step 607).

Using the calculated real time beta ratio and coefficient of discharge values the control unit calculates the mass and volume flow rate of the fluid (Step 608). If the flow of fluid falls to a level outside the range of the measurement apparatus the user moves and sets a new axially position of sleeve within the fluid flow path of the meter body. Alternatively the control unit may be configured to move the sleeve to a new axially position. The new position of the sleeve is communicated to the control unit where a real time beta ratio is calculated. The new sleeve position produces a change in the beta ratio of the measurement apparatus which adjusts the flow rate measurement range of the apparatus. Using the calculated real time beta ratio the control unit calculates the mass and volume flow rate of the fluid.

The control unit displays parameters such as differential pressure readings, pressure readings, temperature, flowing density, flowing compressibility, sleeve position in the meter body fluid flow path, mass and volume flow rate, beta ratio, coefficient of discharge, inner diameter of the meter body throughbore, inner diameter of the sleeve and/or inner diameter of a sleeve throat section for the user to verify that the calculation is being carried correctly (Step 609).

The control unit stores or logs the apparatus, fluid and flow parameters to memory for later assessment or use by the user. This data may be assessed to filter out erroneous data or track recorded data to monitor measurement accuracy (Step 610).

The control unit activates an alarm if the sleeve is in a position where the control unit cannot accurately determine and/or measure a parameter such as differential pressure readings, pressure readings, temperature, flowing density, flowing compressibility, sleeve position in the meter body fluid flow path, mass and volume flow rate, beta ratio, coefficient of discharge, inner diameter of the meter body throughbore, inner diameter of the sleeve and/or inner diameter of a sleeve throat section (Step 611). The alarm will continue to be activated until such time as the sleeve is moved to an acceptable position or the parameter can be accurately determined or measured.

Other mechanism types may be used to axially move and control the position of the annular sleeve in the throughbore fluid flow path of the meter body. In other embodiments of the invention, the sleeve and/or mechanism may be connected to a control unit and/or computer which may be configured to control the positioning of the annular sleeve in response to output flow rates or flow rates ranges.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers. Furthermore, relative terms such as", "downstream", "upstream" and the like are used herein to indicate directions and locations as they apply to the appended drawings and will not be construed as limiting the invention and features thereof to particular arrangements or orientations. Likewise, the term "exit" shall be construed as being an opening which, dependent on the direction of the movement of fluid may also serve as an "entry", and vice versa.

The invention provides an apparatus and method for measuring fluid flow rates. The apparatus comprises a meter body comprising a throughbore with a fluid flow path and a flow displacement member. The apparatus also provides a sleeve slidably mounted within the fluid flow path. The sleeve is configured to be movable between at least two axial positions within the fluid flow path to select a predetermined flow rate measurement range for the flow measurement apparatus.

Variations to the above-described embodiments are within the scope of this invention, and the invention extends to combinations of features other than those specifically claimed herein.

The invention claimed is:

1. A flow measurement apparatus comprising:
a meter body comprising a throughbore with a fluid flow path;

a flow displacement member comprising a diverging cone section and a converging cone section;

a first pressure port configured to be in fluid communication with the fluid flow path at a position upstream of the flow displacement member;

a second pressure port configured to be in fluid communication with the fluid flow path at a position downstream of the flow displacement member, wherein the second pressure port is in fluid communication with an interior passageway of the flow displacement member; and a sleeve configured to be movable when mounted within the fluid flow path to change a diameter of a section of the fluid flow path of the meter body throughbore;

wherein the sleeve is configured to be movable between at least two axial positions within the fluid flow path and wherein the sleeve is configured to be set at different axial positions within the fluid flow path to select a predetermined flow rate measurement range for the flow measurement apparatus; and wherein the flow measurement apparatus is a differential pressure flow meter.

2. The flow measurement apparatus according to claim 1 wherein the sleeve is configured to move relative to the flow displacement member to change an inner diameter of the fluid flow path around the flow displacement member.

3. The flow measurement apparatus according to claim 1 wherein the sleeve is configured to be slidably mounted within the fluid flow path, wherein the sleeve has an annular shape.

4. The flow measurement apparatus according to claim 1 wherein the sleeve has an entrance throat section and/or an exit throat section.

5. The flow measurement apparatus according to claim 4 wherein the entrance and/or exit throat sections has an inclined, stepped or tapered profile.

6. The flow measurement apparatus according preceding claim 1 wherein the apparatus comprises a mechanism operable to effect axial movement of the sleeve between at least two axial positions within the fluid flow path to select a predetermined flow rate measurement range.

7. The flow measurement apparatus according to claim 6 wherein the mechanism is configured to accurately control and/or set the position of the sleeve in the fluid flow path.

8. The flow measurement apparatus according to claim 6 wherein the mechanism is located outside the fluid flow path.

9. The flow measurement apparatus according to claim 6 wherein the mechanism is manually, hydraulically, pneumatically, electrically or mechanically actuated.

10. The flow measurement apparatus according to claim 6 wherein the mechanism is configured to monitor the axial position of the sleeve in the fluid flow path and/or the mechanism is coupled to an indicator and/or display to indicate the position of the sleeve.

11. The flow measurement apparatus according to claim 1 wherein the sleeve is configured to be axially moved from a first position to at least a second position within the fluid flow path and wherein the sleeve is configured to at least partially enclose the flow displacement member when it is in the first or/and at least second position.

12. The flow measurement apparatus according to claim 1 wherein the flow displacement member has a first diverging section and second converging section;

wherein the interface between diverging and converging section forms a peripheral edge.

13. The flow measurement apparatus according to claim 12 wherein a first flow area and/or first beta ratio is defined by the diameter of the peripheral edge of the displacement member and an inner diameter of the fluid flow path of the meter body and wherein a second flow area and/or first beta ratio is defined by the diameter of the peripheral edge of the displacement member and an inner diameter of the sleeve.

14. The flow measurement apparatus according to claim 12 wherein the diameter of the peripheral edge of the displacement member and the inner diameter of the fluid flow path, sleeve and/or a throat section of the sleeve define a flow area and/or beta ratio.

15. The flow measurement apparatus according to claim 1 wherein the apparatus comprises a control unit.

16. The flow measurement apparatus according to claim 15 wherein the control unit comprises adjustable settings for specific parameters selected from the fluid properties, fluid flow path dimensions, sleeve type, sleeve dimensions, mechanism type, flow pressure, differential pressure between an upstream and downstream of a displacement member and flow temperature.

17. The flow measurement apparatus according to claim 15 wherein the control unit is configured to activate an alarm if the sleeve is in an incorrect axial position within the fluid flow path.

18. The flow measurement apparatus according to claim 1 wherein the apparatus comprises at least one sensor to accurately detect and/or determine the position of the sleeve within the fluid flow path.

19. The flow measurement apparatus according to claim 18 wherein the at least one sensor includes selected from a potentiometer, ohmmeter, gauss meter, ultrasonic sensor or distance encoder.

20. The flow measurement apparatus according to claim 1 wherein the flow displacement member is positioned centrally in the fluid flow path and is supported by at least one support member.

21. The flow measurement apparatus according to claim 1 wherein the flow displacement member is a conical cone.

22. The flow measurement apparatus according to claim 1 wherein the sleeve has an erosion resistant coating or layer.

23. The flow measurement apparatus according to claim 1 wherein seals are provided between the outer surface of the sleeve and the inner surface of the fluid flow path of the meter body to prevent fluid egress between the outer surface of the sleeve and the inner surface of the fluid flow path.

24. The flow measurement apparatus according to claim 1, wherein the sleeve is configured to be set at the different axial positions during fluid flow through the fluid flow path when a flowline connected to the flow measurement apparatus is online and/or pressurized.

25. A method of configuring a flow measurement apparatus comprising:

providing a flow measurement apparatus, wherein the flow measurement apparatus is a differential pressure flow meter comprising:

a meter body comprising a throughbore with a fluid flow path;

a flow displacement member comprising a diverging cone section and a converging cone section;

a first pressure port configured to be in fluid communication with the fluid flow path at a position upstream of the flow displacement member;

a second pressure port configured to be in fluid communication with the fluid flow path at a position downstream of the flow displacement member, wherein the second pressure port is in fluid communication with an interior passageway of the flow displacement member; and a sleeve movably mounted within the fluid flow path and configured to be set at different axial positions within the fluid flow path to change a diameter of a section of the fluid flow path of the meter body throughbore;

moving the axial position of the sleeve within the fluid flow path from a first position to at least a second position to select a predetermined flow rate measurement range.

26. The method according to claim 25 comprising obtaining a beta ratio value for the flow measurement apparatus at the first and/or at least second position.

27. The method according to claim 25 comprising calculating a beta ratio value for a desired flow rate measurement and/or flow rate measurement range.

28. The method according to claim 27 comprising determining the axial position of the sleeve required to obtain the desired flow rate measurement and/or flow rate measurement range and moving the axial position of the sleeve to the second position which is the determined axial position of the sleeve required to obtain the desired flow rate measurement and/or flow rate measurement range.

29. The method according to any of claim 25 comprising setting the axial position of the sleeve at the second position sleeve.

30. A method of operating a flow measurement apparatus comprising:

providing a flow measurement apparatus, wherein the flow measurement apparatus is a differential pressure flow meter comprising:

a meter body comprising a throughbore with a fluid flow path;

a flow displacement member comprising a diverging cone section and a converging cone section;

a first pressure port configured to be in fluid communication with the fluid flow path at a position upstream of the flow displacement member;

a second pressure port configured to be in fluid communication with the fluid flow path at a position downstream of the flow displacement member, wherein the second pressure port is in fluid communication with an interior passageway of the flow displacement member; and a sleeve movably mounted within the fluid flow path and configured to be set at different axial positions within the fluid flow path to change a diameter of a section of the fluid flow path of the meter body throughbore;

moving the sleeve between two axial positions within the fluid flow path to select a predetermined flow rate measurement range for the flow measurement apparatus and obtaining a beta ratio value for the flow measurement apparatus at a first and/or second axial position.

31. The method according to claim 30 comprising detecting and/or identifying the axial position of the sleeve within the fluid flow path at a first axial position and/or second position.

32. The method according to claim 30 comprising calculating the mass and volume flow rate of the fluid at a first and/or second axial position.

33. The method according to claim 30 comprising calculating a beta ratio value for a desired flow rate measurement and/or flow rate measurement range.

34. The method according to claim 30 comprising determining the axial position of the sleeve required to obtain the desired flow rate measurement and/or flow rate measurement range and moving the sleeve axially within the fluid conduit to an axial position within the fluid flow path to change the flow rate measurement range to the desired flow rate measurement range.

* * * * *